(12) United States Patent
Kaku

(10) Patent No.: US 10,428,882 B2
(45) Date of Patent: Oct. 1, 2019

(54) BRAKE DEVICE

(71) Applicant: TS TECH CO., LTD., Asaka-shi, Saitama (JP)

(72) Inventor: Hiroyuki Kaku, Tochigi (JP)

(73) Assignee: TS TECH CO., LTD., Saitama (JP)

( * ) Notice: Subject to any disclaimer, the term of this patent is extended or adjusted under 35 U.S.C. 154(b) by 7 days.

(21) Appl. No.: 15/561,897

(22) PCT Filed: Jul. 13, 2016

(86) PCT No.: PCT/JP2016/070636
§ 371 (c)(1),
(2) Date: Sep. 26, 2017

(87) PCT Pub. No.: WO2017/010496
PCT Pub. Date: Jan. 19, 2017

(65) Prior Publication Data
US 2018/0094679 A1  Apr. 5, 2018

(30) Foreign Application Priority Data

Jul. 16, 2015 (JP) .................................. 2015-141996
Jul. 16, 2015 (JP) .................................. 2015-141997
Dec. 24, 2015 (JP) .................................. 2015-252142

(51) Int. Cl.
*F16D 63/00* (2006.01)
*B60N 2/16* (2006.01)
(Continued)

(52) U.S. Cl.
CPC ........... *F16D 63/008* (2013.01); *B60N 2/165* (2013.01); *B60N 2/167* (2013.01); *B60N 2/168* (2013.01);
(Continued)

(58) Field of Classification Search
CPC ........ F16D 63/008; F16D 51/12; F16D 59/02; F16D 63/00; F16D 65/22; F16D 41/082;
(Continued)

(56) References Cited

U.S. PATENT DOCUMENTS 6,253,894 B1   7/2001  Schumann et al.
6,675,945 B2 * 1/2004  Kim ....................... B60N 2/167
                                                                     192/223
(Continued)

FOREIGN PATENT DOCUMENTS

CN      201099186         8/2008
CN      104364547 A       2/2015
(Continued)

OTHER PUBLICATIONS

International Search Report for PCT/JP2016/070636, dated Sep. 6, 2016, 3 pages including English translation.
(Continued)

*Primary Examiner* — Melanie Torres Williams
(74) *Attorney, Agent, or Firm* — Hamre, Schumann, Mueller & Larson, P.C.

(57) ABSTRACT

A brake device comprises: an outer race having a cylindrical inner peripheral surface; a plurality of brake shoes disposed at a radially inner side of the outer race and arranged in a circumferential direction, each brake shoe having a pair of brake surfaces facing the inner peripheral surface and configured to be contactable with the inner peripheral surface and an inside surface facing radially inward; an output-side rotary member disposed at a radially inner side of the brake shoes, having an opposed surface provided at an outer periphery thereof and facing the inside surface; and an input-side rotary member configured to contact the brake shoes in the circumferential direction and thereby capable of imparting a rotary torque to the brake shoes. The brake shoe
(Continued)

has a support surface disposed between the brake surfaces and configured to be contactable with the inner peripheral surface.

21 Claims, 27 Drawing Sheets

(51) Int. Cl.
*F16D 51/12* (2006.01)
*F16D 59/02* (2006.01)
*F16D 65/22* (2006.01)
*F16D 41/08* (2006.01)
*F16D 125/28* (2012.01)
*F16D 127/00* (2012.01)

(52) U.S. Cl.
CPC ............ *F16D 51/12* (2013.01); *F16D 59/02* (2013.01); *F16D 63/00* (2013.01); *F16D 65/22* (2013.01); *F16D 41/082* (2013.01); *F16D 2125/28* (2013.01); *F16D 2127/004* (2013.01)

(58) Field of Classification Search
CPC . F16D 2125/28; F16D 2127/004; B60N 2/16; B60N 2/167; B60N 2/168; B60N 2/1685; B60N 2/236; A47C 3/20
See application file for complete search history.

(56) References Cited

U.S. PATENT DOCUMENTS

| | | | |
|---|---|---|---|
| 8,789,677 B2 | 7/2014 | Krueger et al. | |
| 9,599,174 B2 | 3/2017 | Kaku | |
| 9,884,572 B2 | 2/2018 | Kaku | |
| 2010/0219037 A1* | 9/2010 | Cai | B60N 2/938 |
| | | | 192/223 |
| 2011/0304190 A1 | 12/2011 | Krueger et al. | |
| 2015/0152927 A1 | 6/2015 | Kaku | |
| 2015/0360589 A1* | 12/2015 | Robinson | B60N 2/236 |
| | | | 297/367 P |
| 2016/0280099 A1 | 9/2016 | Kaku | |

FOREIGN PATENT DOCUMENTS

| | | |
|---|---|---|
| DE | 102009005044 | 7/2010 |
| DE | 102010062311 | 2/2012 |
| EP | 2860422 | 4/2015 |
| JP | 2002511035 A | 4/2002 |
| JP | 2013253661 A | 12/2013 |
| JP | 2014031090 A | 2/2014 |
| JP | 2014185669 A | 10/2014 |
| JP | 2015067014 | 4/2015 |
| WO | 2014148600 | 9/2014 |

OTHER PUBLICATIONS

Office Action issued for Chinese Patent Application No. 201680019230. X, dated Nov. 13, 2018, 8 pages including English translation.
Extended European Search Report issued for European Patent Application No. 16824476.2, dated Apr. 5, 2019, 6 pages.

* cited by examiner (a)

(b)

BRAKE DEVICE

TECHNICAL FIELD

The present invention relates to a brake device for use in a height adjustment mechanism for a vehicle seat, or the like.

BACKGROUND ART

In a height adjustment mechanism for a vehicle seat, a brake device is used which is configured such that an output shaft is caused to rotate by a swinging-up/swinging-down operation of a lever provided at an input side thereof but is prevented from rotating when a force which is derived from the weights of the seat and an occupant seated thereon and by which the seat is biased downward is applied to the output shaft.

For example, the brake device of Patent Document 1 includes three brake shoes (brake cams) arranged circumferentially inside an outer race and an output-side rotary member arranged at radially inner sides of the brake shoes. The output-side rotary member has opposed surfaces (surfaces opposite the brake shoes) each shaped as if formed by cutting part of an outer cylindrical surface flat, such that a rotary torque inputted to the output-side rotary member causes an edge formed at an extremity of each of these opposed surfaces to contact the brake shoe and push the brake shoe radially outside, thereby producing a frictional force between the brake shoe and the outer race and stopping the rotation of the output-side rotary member.

The brake device of Patent Document 2 includes an outer race having a cylindrical inner peripheral surface, a plurality of brake shoes (clamping members) opposite to the inner peripheral surface, and an output-side rotary member (pinion with wings) arranged at inner sides of the brake shoes. Herein, two sets of the clamping members are provided along an axial direction of the pinion. To be more specific, one set of the clamping members in pair is provided at one position along the axial direction of the pinion such that a central axis of the pinion is sandwiched between the clamping members in pair and two sets (pairs) of such clamping members are arranged along the axial direction of the pinion (i.e., the total four clamping members are provided).

Two of the four clamping members (one in a first set and one in a second set) are configured to stop the rotation of the pinion in the normal direction, while the other two of the clamping members (another in the first set and another in the second set) are configured to stop the rotation of the pinion in the reverse direction.

CITATION LIST

Patent Literature

Patent Document 1: JP 2014-185669 A
Patent Document 2: JP 2002-511035 A

SUMMARY OF INVENTION

Technical Problem

In the configuration of Patent Document 1, an excessively large rotary torque, if given to the output-side rotary member, causes a cam surface region extending between regions corresponding to the pair of brake surfaces to be strongly pushed outward in the radial direction, and imposes a great bending stress on each brake shoe, such that deformation or cracks of the brake shoe would possibly occur as the case may be. Also, the operation of the operation lever carried out in an attempt to lower the vehicle seat when the braking force is being produced by the weight of the vehicle seat, i.e., when the rotary torque is being input from the vehicle seat to the output-side rotary member would disadvantageously cause the vehicle seat to abruptly lower as a result of loss of braking force at the inevitable moment when the brake shoe loses its contact with the output-side rotary member.

On the other hand, in the configuration of Patent Document 2, where a braking force effected in one direction of rotation is produced only one of two clamping members in one set, two sets of the pair of clamping members should necessarily be provided in order to produce a stable and sufficient braking force. Accordingly, upsizing of the brake device in the axial direction would be a disadvantage to be overcome.

With this as a backdrop, the inventors named herein have made the present invention in an attempt to provide a brake device in which a load imposed on the brake shoes can be reduced.

Solution to Problem

A brake device according to one or more of embodiments of the present invention comprises: an outer race having a cylindrical inner peripheral surface; a plurality of brake shoes disposed inside, with respect to a radial direction, of the outer race and arranged in a circumferential direction, each brake shoe having a pair of brake surfaces and an inside surface, each brake surface facing the inner peripheral surface, the brake surface being contactable with the inner peripheral surface, the inside surface facing inward with respect to the radial direction; an output-side rotary member disposed inside, with respect to the radial direction, of the brake shoes, the output-side rotary member having an opposed surface provided at an outer periphery thereof, the opposed surface facing the inside surface; and an input-side rotary member configured to contact the brake shoes or the output-side rotary member in the circumferential direction and thereby capable of imparting a rotary torque to the output-side rotary member, wherein a rotary torque as imparted in at least one direction of rotation to the output-side rotary member causes the opposed surface to push the inside surface and thereby causes the brake surface to be pressed against the inner peripheral surface of the outer race, thus failing to cause the brake shoe to rotate, and wherein the brake shoe has a support surface disposed between the pair of brake surfaces, the support surface being contactable with the inner peripheral surface.

With this configuration, when the support surface of the brake shoe is caused to contact the inner peripheral surface of the outer race by the output-side rotary member to which a rotary torque is imparted and of which the opposed surface thus pushes the inside surface of the brake shoe, the load imposed on a portion of the brake shoe between the pair of brake surfaces can be supported by the outer race. Therefore, the load stress imposed on the brake shoe can be reduced.

The brake device as described above may be configured such that the support surface is kept apart from the inner peripheral surface when no load is imposed on the brake shoe.

With this feature, when no excessively large rotary torque is given to the output-side rotary member, the braking force is produced at one pair of the brake surfaces, so that the braking force can be produced stably. On the other hand, when an excessively large rotary torque is given to the output-side rotary member and causes the support surface to contact the inner peripheral surface, an excessively large deformation of the brake shoe can be suppressed, and the force from the opposed surface is thus received reliably by the inside surface, so that a large braking force can be produced. Also, when a rotary torque is given to the brake shoe in the circumferential direction by the input-side rotary member, the support surface and the inner peripheral surface will not rub against each other, so that wearing of the support surface and other parts can be suppressed, and a smooth operation can be expected.

The brake device as described above may be configured such that the brake shoe includes a protrusion protrusively provided at an outer periphery thereof, wherein the support surface is provided on the protrusion.

With this feature, the rigidity of the brake shoe can be increased, so that the load stress imposed on the brake shoe can be reduced more effectively. Also, when the support surface contacts the inner peripheral surface, the position of the support surface which contacts the inner peripheral surface is invariable, so that more stable operation can be expected.

The brake device as described above may be configured such that the support surface is provided in a middle position between the pair of brake surfaces.

With this feature, when the support surface contacts the inner peripheral surface, the brake shoe can be supported stably, so that the load stress imposed on the brake shoe can be reduced more effectively.

The brake device as described above may be configured such that the support surface has a shape contoured to fit the inner peripheral surface.

With this feature, when the support surface contacts the inner peripheral surface, the position on the brake shoe in which a bending stress becomes greatest can be supported, so that the load stress imposed on the brake shoe can be reduced more effectively.

The brake device as described above may further comprise a movable element arranged between the inside surface and the opposed surface, and a biasing member configured to bias the movable element into a narrower side of a space formed between the inside surface and the opposed surface, wherein the opposed surface includes a region nonparallel to the inside surface, and wherein a load is transmitted between the inside surface and the opposed surface via the movable element.

With these features, the rotary torque as imparted in at least one direction of rotation to the output-side rotary member causes the movable element to push the inside surface and thereby causes the brake surface to be pressed against the inner peripheral surface, thus failing to cause the brake shoe to rotate. In this state, if the brake shoe is caused to rotate in one direction of rotation or the other direction of rotation by the input-side rotary member, the movable element can be consistently held between the inside surface and the opposed surface, i.e., kept in contact with these surfaces, because the movable element is being biased into the narrower side of the space formed between the inside surface and the opposed surface; therefore, an abrupt and entire release of the braking force can be made unlikely to occur. Accordingly, the stable operation can be expected.

The brake device as described above may be configured such that the support surface is located in such a position that as viewed with a line of sight aligned with an axial direction of the output-side rotary member, the support surface intersects a straight line extending through a center of curvature of the inner peripheral surface and the movable element.

With this feature, the support surface located at a side of the brake shoe substantially opposite, with respect to the radial direction, to a side of the brake shoe to be pushed by the movable element contacts the inner peripheral surface, and thus the load imposed through the movable element on the brake shoe can be supported by the support surface efficiently. Accordingly, the load stress imposed on the brake shoe can be reduced more effectively.

In the above-described configurations with the movable element and the biasing member, it may be feasible that the inside surface includes a first contact surface contactable with the movable element, the first contact surface being parallel to a direction of extension of a straight line connecting two ends of the pair of brake surfaces in the circumferential direction, wherein the opposed surface includes a second contact surface that is contactable with the movable element when no load is imposed on the brake shoe, the second contact surface being inclined with respect to the first contact surface.

With this configuration, the rotary torque as imparted in at least one direction of rotation to the output-side rotary member causes the movable element to push the inside surface of the brake shoe and thereby causes the brake surface to be pressed against the inner peripheral surface of the outer race, thus failing to cause the brake shoe to rotate. In this state, if the brake shoe is caused to rotate in one direction of rotation or the other direction of rotation by the input-side rotary member, the movable element can be consistently held between the inside surface and the opposed surface, i.e., kept in contact with these surfaces, because the movable element is being biased into the narrower side of the space formed between the inside surface and the opposed surface; therefore, an abrupt and entire release of the braking force can be made unlikely to occur. Moreover, each of the plurality of brake shoes arranged in the circumferential direction can produce the braking force, and thus upsizing in the axial direction can be suppressed. With these features, the downsizing in the axial direction as well as the stable operation can be achieved. Also, since the movable element is held between, and kept in contact with, the first contact surface of the inside surface and the second contact surface (inclined with respect to the first contact surface) of the opposed surface, the movable element can be held stably, and the backlash of the movable element can be suppressed.

The brake device as described above may be configured such that the second contact surface includes an oblique region so inclined as to get nearer to the first contact surface with distance from a reference plane intersecting a center of curvature of the inner peripheral surface and perpendicular to the first contact surface.

The brake device as described above may be configured such that the second contact surface includes a first curved region bulging toward the brake shoe as viewed with a line of sight aligned with an axial direction of the output-side rotary member.

If the rotary torque is given to the output-side rotary member and causes the output-side rotary member to rotate to some extent, so as to make a distance between the first contact surface and the second contact surface narrower, then, the pressure between the movable element and the first and second contact surfaces increases. From this state, if the output-side rotary member further rotates due to an excessively large amount of the given rotary torque or other circumstances, then an alternative flat-design second contact surface would possibly render an angle between the first contact surface and the second contact surface greater, or so great as to cause the movable element to move toward the wider side of the space formed between the first contact surface and the second contact surface, reducing the pressure, thus lowering the braking force, as the case may be. With this in view, the second contact surface is configured to have the first curved region bulging toward the brake shoe, so that even when the output-side rotary member further rotates, the angle between the first contact surface and the second contact surface can be restrained from increasing, and maintained within an appropriate range. Accordingly, the movable element can be continuously held between the first contact surface and the second contact surface (i.e., kept under high pressure), so that the braking force can be maintained and stable production of the braking force can be achieved.

The brake device as described above may be configured such that the second contact surface has radii of curvature so distributed as to decrease with distance from the reference plane.

With this feature, even if the output-side rotary member further rotates, the angle between the first contact surface and the second contact surface can be more effectively restrained from increasing and maintained within the appropriate range, so that the braking force can be produced more stably.

In the brake device as described above, the second contact surface may be configured such that when the rotary torque is inputted to the output-side rotary member, a nip angle that a tangent plane of the second contact surface at a point of contact with the movable element forms with the first contact surface increases and subsequently decreases with increase in angle of rotation of the output-side rotary member caused by the inputted rotary torque. In this configuration, the nip angle may preferably have a maximum value of 7.55 degrees or smaller.

With this configuration, even if a large rotary torque inputted to the output-side rotary member causes a gradual increase in angular displacement of the output-side rotary member with respect to the brake shoe, the nip angle would not become too great, so that the movable element can be made unlikely to slip toward the wider side of the space formed between the inside surface and the opposed surface.

The brake device as described above may be configured such that the second contact surface is provided one in each of two outer end regions of the opposed surface in the circumferential direction.

With this feature, the configuration in which a rotary torque given to the output-side rotary member in both of one direction of rotation and the other direction of rotation fails to cause the brake shoe to rotate can be adapted to an application.

The brake device as described above may be configured such that the opposed surface includes a connecting surface region that connects the second contact surfaces provided at the two end regions.

With this feature, the presence of the connecting surface region ensures that a space be provided between a movable element contactable with one second contact surface and a movable element contactable with the other second contact surface; therefore, the biasing member to be disposed in this space can be installed therein with ease.

The brake device as described above may be configured such that the opposed surface has a recess at a joint between each of the second contact surfaces and the connecting surface region.

With this feature, the recess can serve as a visible indication for use in installing the movable element along the recess, as well as a temporary retainer for use in fitting the installed movable element therein, which makes it possible to easily install the biasing member between the two movable elements. In short, the movable elements and the biasing member can be installed with increased ease.

The brake device as described above may be configured such that the connecting surface region includes a flat region.

With this feature, an appropriately sized space can be provided between the connecting surface region and the brake shoe without fail, in comparison with an alternative configuration in which the connecting surface region includes a surface protruding partly toward the brake shoe side or another configuration in which the connecting surface region includes a surface recessed toward a side opposite to the brake shoe side. Accordingly, the biasing member to be disposed in this space can be easily installed therein.

The brake device as described above may be configured such that the output-side rotary member has a second curved region connecting respective opposed surfaces so provided as to correspond to the respective brake shoes.

The brake device as described above may be configured such that the movable element is a roller.

With this feature, a load-carrying capacity can be made greater than an alternative configuration in which the movable element is a ball, and the movable element can be more smoothly operable than an alternative configuration in which the movable element is a polygon, so that a stable operation can be realized.

The brake device as described above may be configured such that the input-side rotary member includes an engageable portion that is engageable with the output-side rotary member to enable transmission of a rotary torque thereto.

With this configuration, the engageable portion can directly engage with the output-side rotary member and transmit a torque to the output-side rotary member; therefore, while a rotational force is being inputted to the output-side rotary member from outside, if a rotational force so directed as to oppose that rotational force is inputted to the input-side rotary member, the rotational force inputted to the output-side rotary member is directly received and borne by the input-side rotary member, so that the output-side rotary member can be caused to rotate accordingly. Thus, undesired rotation of the output-side rotary member in an unintended direction as a result of unexpected loss of the braking force can be prevented, and a stable operation can be realized.

The brake device including the engageable portion may be preferably be configured to have the engageable portion arranged such that engagement of the engageable portion with the output-side rotary member occurs prior to engagement of the input-side rotary member with the brake shoes, when the input-side rotary member is rotated in a direction reverse to a rotary torque concurrently inputted to the output-side rotary member and borne by a braking force of the brake shoes.

With this configuration, the input-side rotary member uses engagement of its engageable portion with the output-side rotary member to start rotation of the output-side rotary member without the need to rotate the brake shoes constrained by a large frictional force between each brake shoe and the outer race. Accordingly, the rotation of the output-side rotary member can be started with a small initial load, and a feel of friction as if it scratches can be reduced.

DESCRIPTION OF EMBODIMENTS

Hereafter, a detailed description will be given of some embodiments of the present invention with reference made to the drawings where appropriate.

First Embodiment

Figure 1:
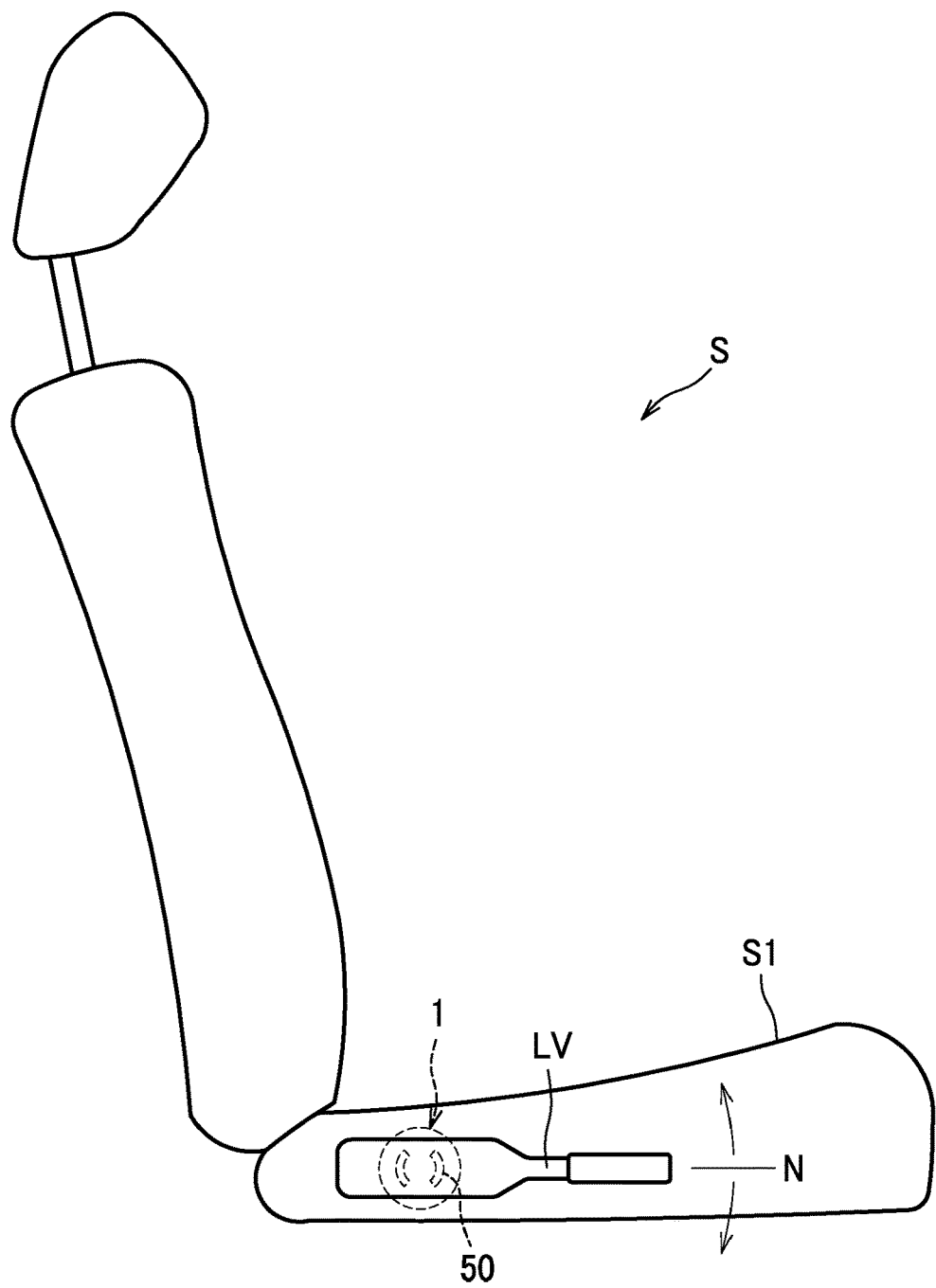
FIG. 1 is a side view of a seat for transportation.

As shown in FIG. 1, a clutch unit 1 according to one embodiment, which includes a brake device according to the present invention, is intended for application to a known height adjustment mechanism for adjusting a height of a seat cushion S1 of a vehicle seat S as one example of a seat for transportation. The clutch unit 1 is configured to include an operating action receiving member 50 to which a lever LV is attached, and an output-side rotary member 30 which will be described later, such that the height of the seat cushion S1 can be adjusted by causing the output-side rotary member 30 to rotate (thus actuating the height adjustment mechanism) through the operation of the lever LV. To be more specific, the clutch unit 1 is configured such that when the lever LV is raised from a neutral position N, the seat cushion S1 is caused to move up a predetermined distance, and when the lever LV is lowered from the neutral position N, the seat cushion S1 is caused to move down a predetermined distance. On the other hand, the clutch unit 1 is configured such that the output-side rotary member 30 is not caused to rotate when the lever LV is returned from the upper or lower position to the neutral position N.

Figure 2:
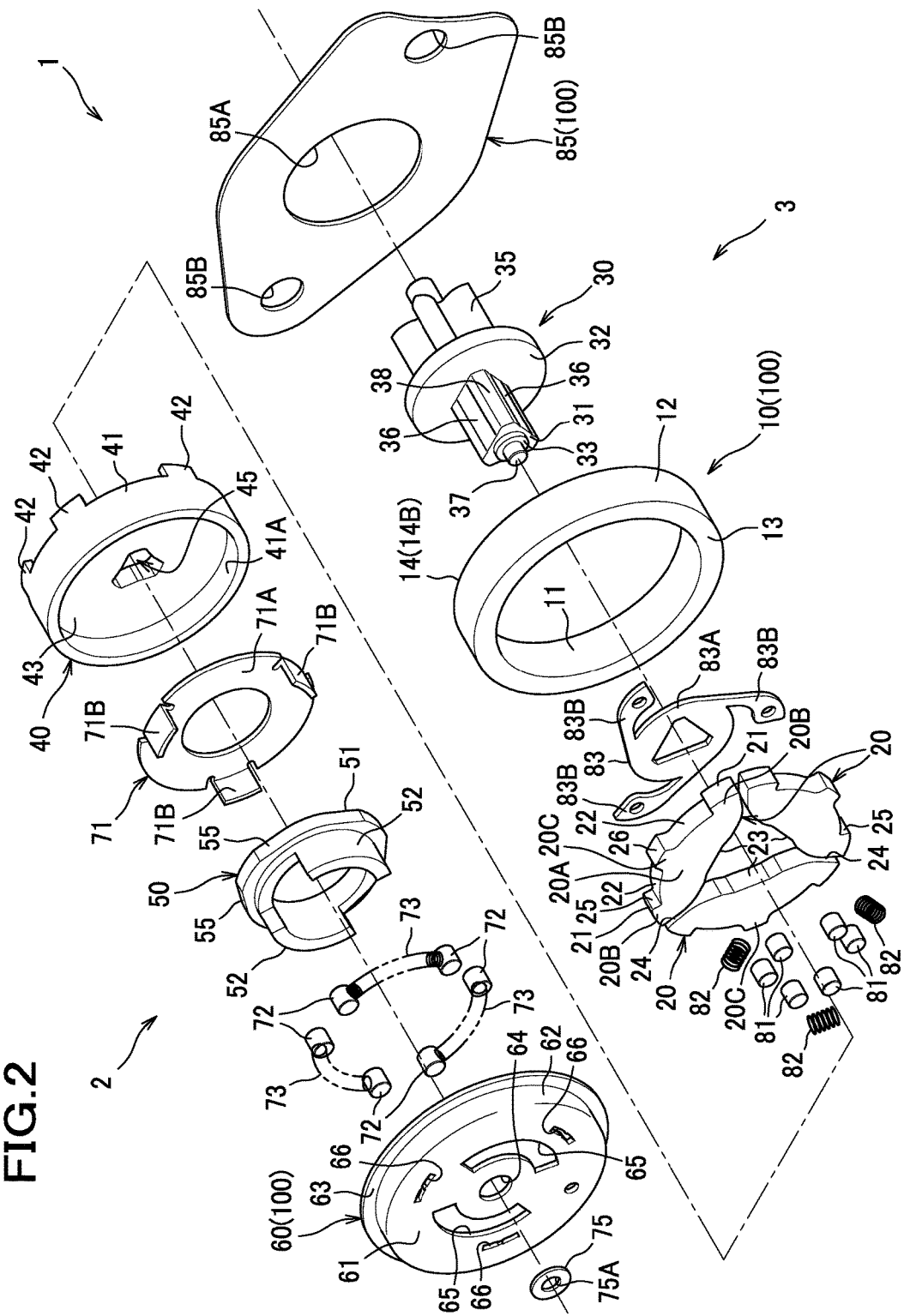
FIG. 2 is an exploded perspective view of a clutch unit.

As showed in FIG. 2, the clutch unit 1 is configured to include a housing 100 in which its constituent members are housed. The housing 100 is made up of a combination of an outer race 10, a mounting plate 85 and a cover member 60. In the following description, the left side of FIG. 2 on which the cover member 60 and the operating action receiving member 50 are disposed will be referred to as "input side", while the right side of FIG. 2 on which the output-side rotary member 30 is disposed will be referred to as "output side".

The clutch unit 1 includes a ratchet device 2 provided at the input side and configured to selectively provide and interrupt transmission of an input torque produced by a swinging operation of the operating action receiving member 50, and a brake device 3 provided at the output side and configured to provide transmission of the input torque from the ratchet device 2 to an output gear 35 of the output-side rotary member 30 and to interrupt transmission of a reverse input torque from the output gear 35.

A brief outline is herein given of constituent parts of the ratchet device 2 and the brake device 3. The ratchet device 2 comprises an operating action receiving member 50, a restriction member 71, rollers 72, and return springs 73. On the other hand, the brake device 3 comprises an outer race 10, brake shoes 20, an output-side rotary member 30, an input-side rotary member 40, rollers 81 as an example of movable elements, springs 82 as an example of biasing members, a friction ring 83, and a washer 75. It is to be understood that the input-side rotary member 40 also serves as an output member for the ratchet device 2, not to mention as an input member for the brake device 3; thus, the input-side rotary member 40 may be regarded as a part of the ratchet device 2 and as a part of the brake device 3.

Next, a detailed description will be given of the configurations of the brake device 3 and the ratchet device 2.

The first discussion is directed to the configuration of the brake device 3.

The outer race 10 is made up of a ring having a predetermined thickness, and includes a cylindrical inner peripheral surface 11, a cylindrical outer peripheral surface 12, and a pair of side surfaces 13, 14 that connect the inner peripheral surface 11 and the outer peripheral surface 12. The pair of side surfaces 13, 14 are flat surfaces disposed outside of the inner peripheral surface 11 with respect to a radial direction of the outer race 10, and perpendicular to an axis of the inner peripheral surface 11. In this description, the radial direction and a circumferential direction are referred to as of the outer race 10.

The mounting plate 85 configured in conjunction with the outer race 10 to form a part of the housing 100 is a member of sheet metal which is designed to serve as a support for the brake device 3. The mounting plate 85 has two mounting holes 85B formed therein as mounting structures with which the brake device 3 is mounted to a frame of the seat cushion S1 or the like. In addition, the mounting plate 85 has a through hole 85A formed in a center thereof in which the output-side rotary member 30 is disposed. Since the outer race 10 is fixed to the mounting plate 85, the clutch unit 1 can be mounted to any device of a varied kind.

Figure 9:
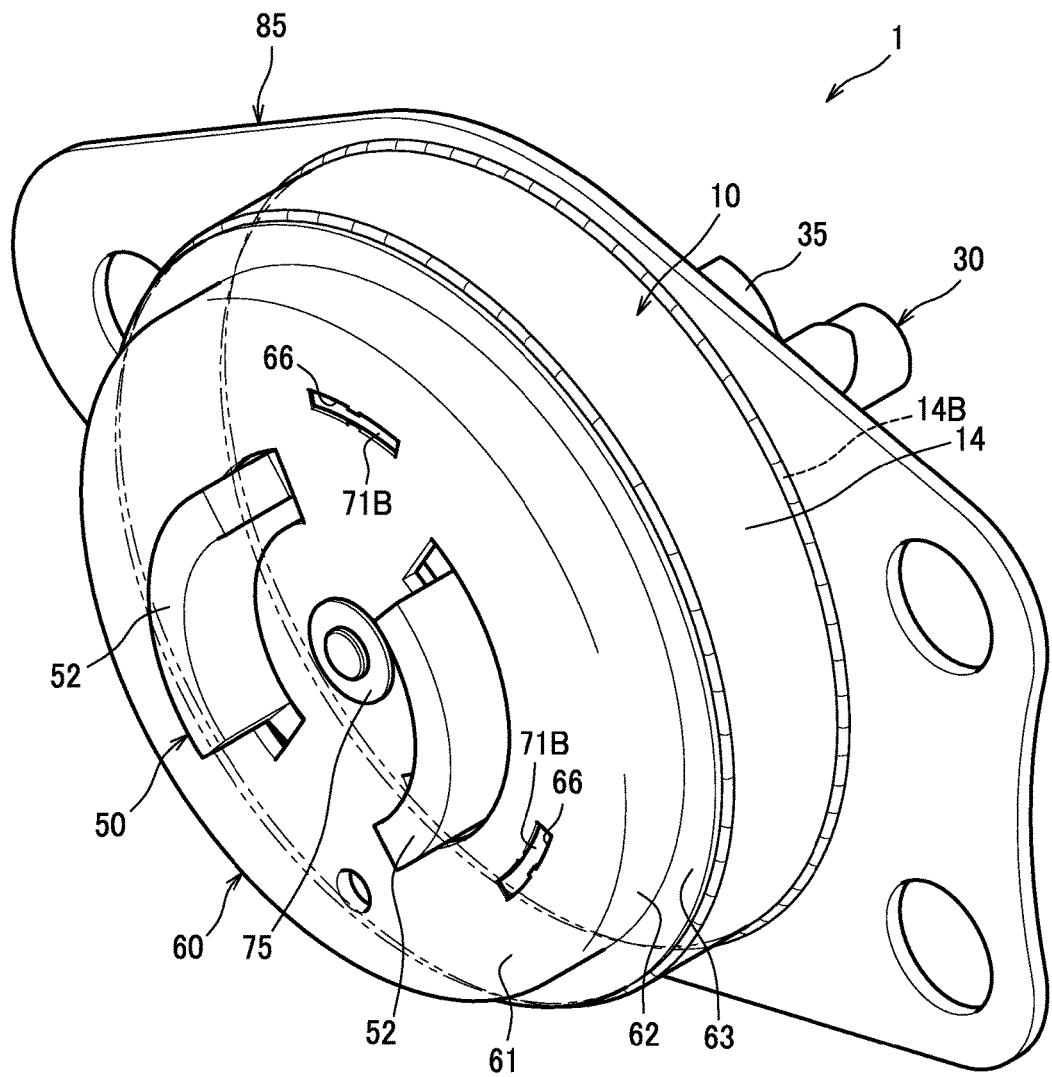
FIG. 9 is a perspective view of the clutch unit as viewed from a cover-member side.

The outer race 10 is a part formed by stamping out a thick plate in a press forming process, and has an outer peripheral edge 14B of the output-side side surface 14 thereof welded to an input-side surface of the mounting plate 85 by laser welding. This weld is formed along the entire circumference (of the outer peripheral edge 14B) of the side surface 14 as shown in FIG. 9. Welding of the mounting plate 85 all around the circumference of the side surface 14 of the outer race 10 may serve to enhance the weld strength as well as to reinforce the outer race 10 with the mounting plate 85. Welding of the side surface 14 and the mounting plate 85 along the outermost edge of the annular side surface 14 may serve to enhance the retentive strength of the weld against the force exerted in the direction of rotation.

Referring back to FIG. 2, the brake shoes 20 are illustrated as members provided such that a braking force is produced between each brake shoe 20 and the outer race 10; three brake shoes 20 are arranged inside, with respect to the radial direction, of the outer race 10 equidistantly in the circumferential direction. The brake shoe 20 is configured to include a main body portion 20A extending in the circumferential direction, projecting portions 20B projecting radially outward at an outer periphery of the main body portion 20A, and a protrusion 20C.

The projecting portions 20B are provided one at each of two end regions of the outer periphery of the main body portion 20A in the circumferential direction. Each projecting portion 20B has, at a radially outside projecting end thereof, a brake surface 21 facing the inner peripheral surface 11 of the outer race 10 and contactable with the inner peripheral surface 11. This brake surface 21 has substantially the same curvature as that of the inner peripheral surface 11 of the outer race 10, and has an outer region or a region adjacent thereto in the circumferential direction of the brake surface 21, arranged to contact the inner peripheral surface 11 of the outer race 10. With this arrangement, when the brake shoe 20 is biased radially outward, the contact region of the brake surface 21 that is the outer region or the region adjacent thereto in the circumferential direction of the brake surface 21 is pressed against the inner peripheral surface 11 of the outer race 10.

The protrusion 20C is provided in a middle position of the outer periphery of the main body portion 20A in the circumferential direction. At a radially outside protruding end of the protrusion 20C, a support surface 26 contactable with the inner peripheral surface 11 of the outer race 10 is provided. In other words, the support surface 26 is provided in the middle position between the pair of brake surfaces 21. This support surface 26 has a substantially the same curvature as that of the inner peripheral surface 11 of the outer race 10, and configured as a cylindrical surface extending along the inner peripheral surface 11 of the outer race 10. The support surface 26 is kept apart from the inner peripheral surface 11 of the outer race 10 when no load is imposed on the brake shoe 20 and the output-side rotary member 30.

The brake shoe 20 has outer peripheral surfaces 22 each configured as a cylindrical surface having a radius of curvature smaller than that of the brake surface 21, between one of the pair of brake surfaces 21 and the support surface 26 and between the other of the pair of brake surfaces 21 and the support surface 26. The brake shoe 20 further has an inside surface 23 facing inward with respect to the radial direction. The brake shoe 20 has end surfaces 24 provided at the ends of the brake shoe 20 in the circumferential direction, the end surfaces 24 each connecting an end of the inside surface 23 and an end 21E of one of the two brake surfaces 21. The brake shoe 20 has circumferentially facing rotary force input surfaces 25 formed at a stepped portion each formed between the brake surface 21 and the outer peripheral surface 22.

The support surface 26 has at least one region disposed to cover the same range as that of the pair of the brake surfaces 21 in the axial direction of the output-side rotary member 30. In other words, there is at least one plane perpendicular to an axis of the output-side rotary member 30 and intersecting through both of the pair of brake surfaces 21 and the support surface 26. In the present embodiment, the thickness of the pair of projecting portions 20B and the thickness of the protrusion 20C are substantially equal to each other (see FIG. 2), and the substantially whole support surface 26 is disposed in the same range as that of the pair of brake surfaces 21 in the axial direction of the output-side rotary member 30.

Each of the inside surfaces 23 includes three surfaces each facing the opposed surface 36 that will be described later of the output-side rotary member 30. To be more specific, as shown in FIG. 4(a), the inside surface 23 includes a first contact surface 23A, a first oblique surface 23B disposed at a counterclockwise downstream side (see the drawing) of the first contact surface 23A, and a first oblique surface 23C disposed at a clockwise downstream side (see the drawing) of the first contact surface 23A. The first contact surface 23A is a flat surface that is contactable with the rollers 81, and is parallel to a direction (connecting direction as indicated by arrow in FIG. 4(a)) of extension of a straight line L1 (see FIG. 3) connecting two ends 21E of the pair of brake surfaces 21 in the circumferential direction. The first oblique surfaces 23B, 23C are flat surfaces so inclined with respect to the first contact surface 23A as to get nearer to the opposed surface 36 (going down in the drawing) with distance from the first contact surface 23A disposed therebetween.

As shown in FIG. 2, the output-side rotary member 30 is configured to include an action portion 31 having a shape of a shaft, a flange 32 formed at the output side of the action portion 31, a support shaft portion 33 protruding from the action portion 31 to the input side, coaxial with the action portion 31 and having a diameter smaller than that of the action portion 31, a shaft portion 37 protruding from the support shaft portion 33 to the input side, coaxial with the support shaft portion 33 and having a diameter smaller than the support shaft portion 33, and an output gear 35 so formed as to protrude from the flange 32 to the output side. The output-side rotary member 30 is disposed inside, with respect to the radial direction, of the brake shoes 20. The output gear 35 protrudes through the through hole 85A of the mounting plate 85 to the output side.

Figure 3:
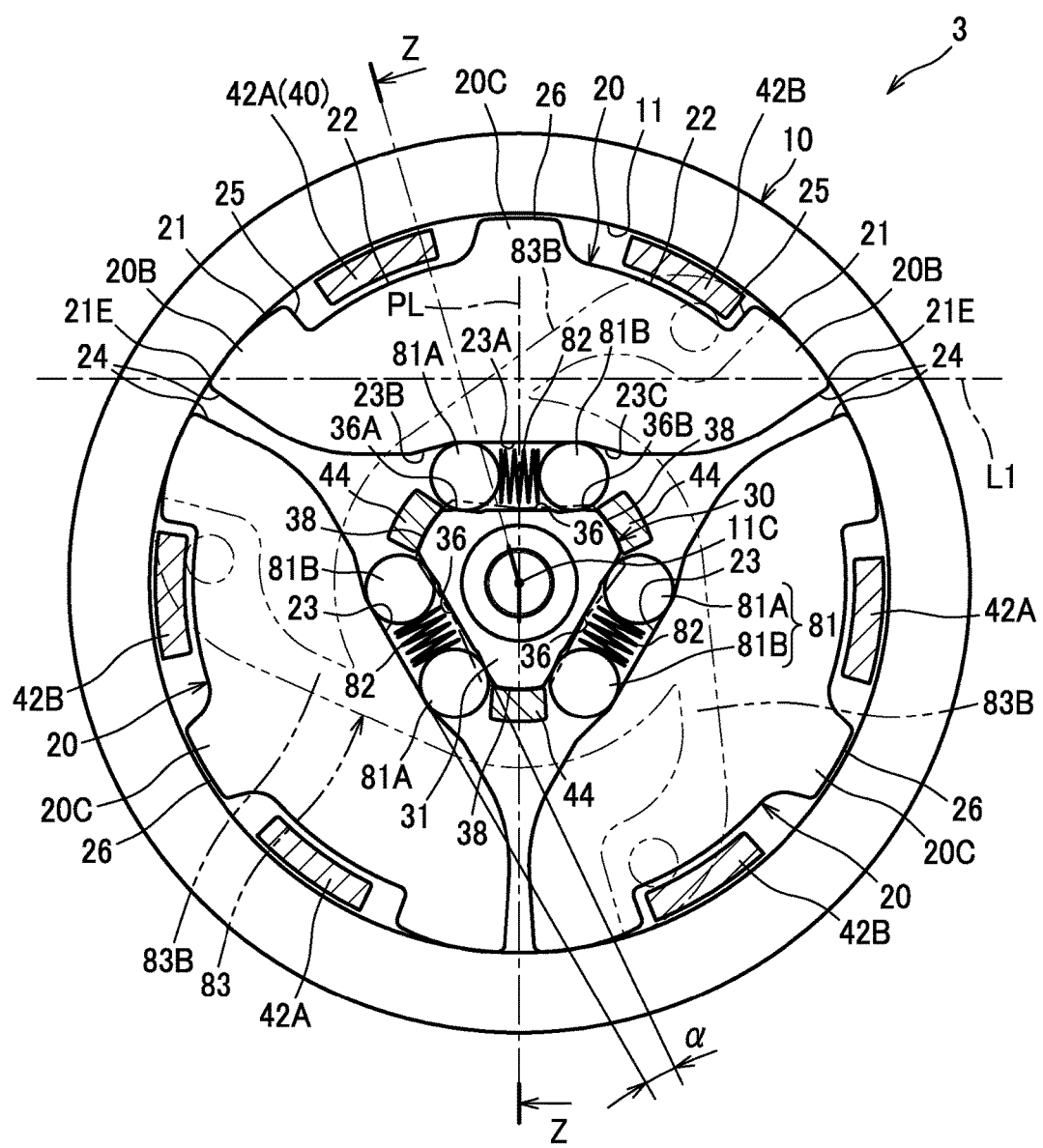
FIG. 3 is a cross section of a brake device.
Figure 4:
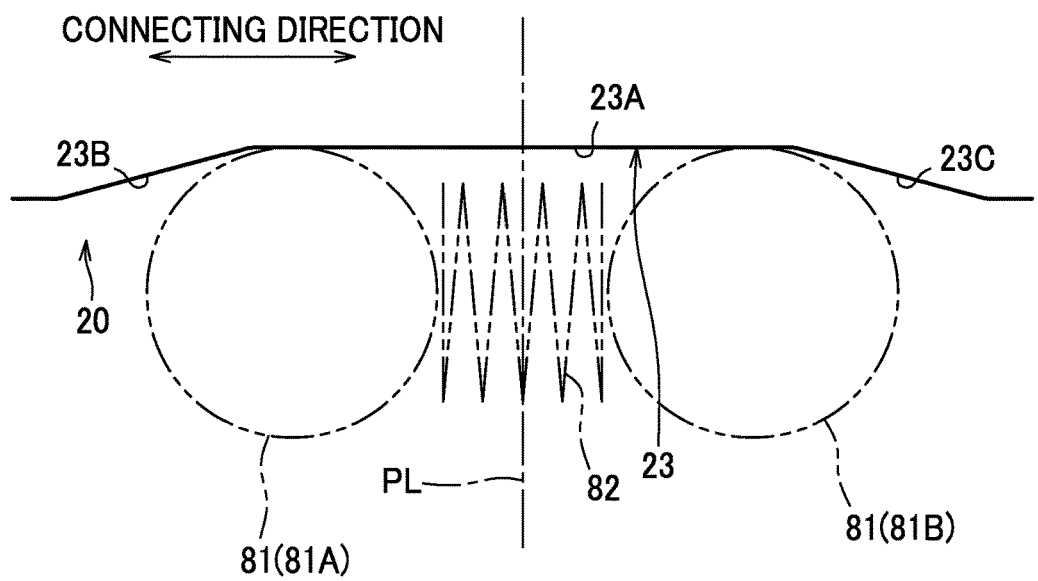
FIG. 4 includes (a) an enlarged view of an inside surface of a brake shoe and its vicinity, and (b) an enlarged view of an opposed surface of an output-side rotary member and its vicinity.
Figure 4:
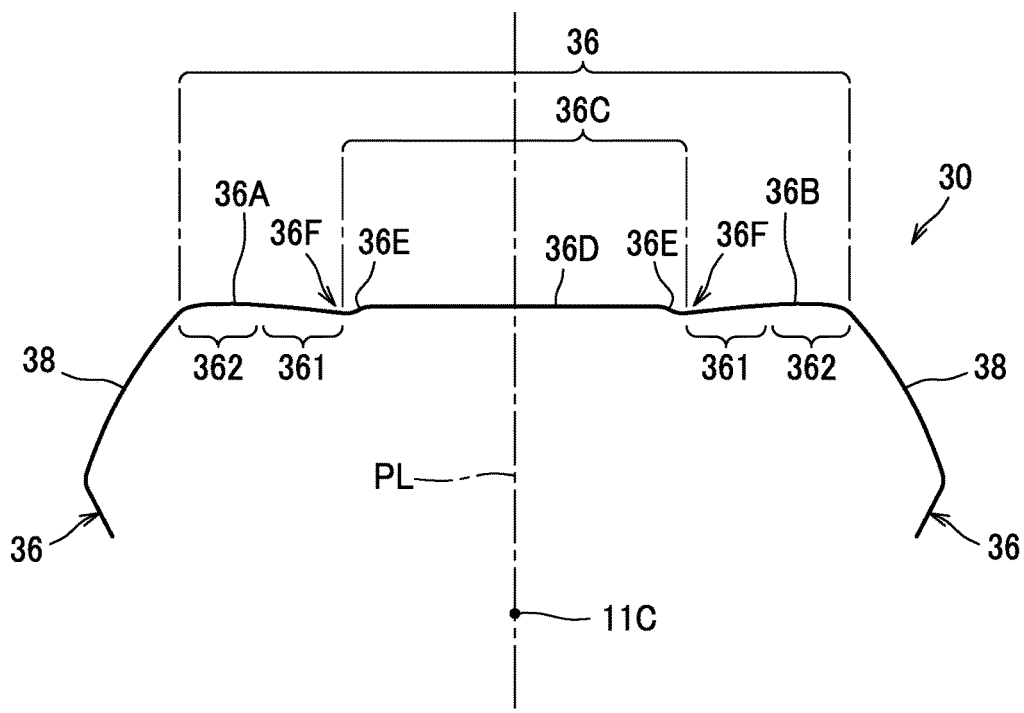

As shown in FIG. 3, the action portion 31 has, at an outer periphery thereof, opposed surfaces 36 facing the inside surfaces 23 of the brake shoes 20, and curved regions 38 as an example of a second curved region 38. Three opposed surfaces 36 are provided at an outer periphery of the action portion 31 in three positions corresponding to those of the inside surfaces 23 of the respective brake shoes 20. The curved regions 38 are portions connecting the opposed surfaces 36 corresponding to the respective brake shoes 20; the total three curved regions 38 are provided one between each pair of circumferentially adjacent opposed surfaces 36. The curved regions 38 are formed as curved surfaces each having a shape of a segment of a circle in cross section, of which the center coincides with the center of rotation of the output-side rotary member 30.

As shown in FIG. 4(b), the opposed surface 36 includes second contact surfaces 36A, 36B disposed one in each of two outer end regions of the opposed surface 36 in the circumferential direction, and a connecting surface region 36C connecting the second contact surfaces 36A, 36B provided at the two end regions. The second contact surface 36A is disposed at the counterclockwise downstream side (see the drawing) of the connecting surface region 36C, and the second contact surface 36B is disposed at the clockwise downstream side (see the drawing) of the connecting surface region 36C.

The second contact surface 36A, 36B is contactable with the roller 81 when no load is imposed on the brake shoe 20, and includes an oblique region 361 so inclined toward the first contact surface 23A, and a curved region 362 (as a first curved region) disposed continuously outside the oblique region 361. The oblique region 361 is so inclined as to get nearer to the first contact surface 23A (going up in the drawing) with distance from a reference plane PL intersecting a center 11C of curvature (see FIG. 3) of the inner peripheral surface 11 of the outer race 10 and perpendicular to the first contact surface 23A. The curved region 362 is configured as a curve having a convex shape that bulges toward the brake shoe 20 as viewed with a line of sight aligned with the axial direction of the output-side rotary member 30, and configured to have a radius of curvature decreasing with distance from the reference plane PL. With these second contact surfaces 36A, 36B configured as described above, the opposed surface 36 includes a region nonparallel to the first contact surface 23A that is part of the inside surface 23 of the brake shoe 20.

Figure 5:
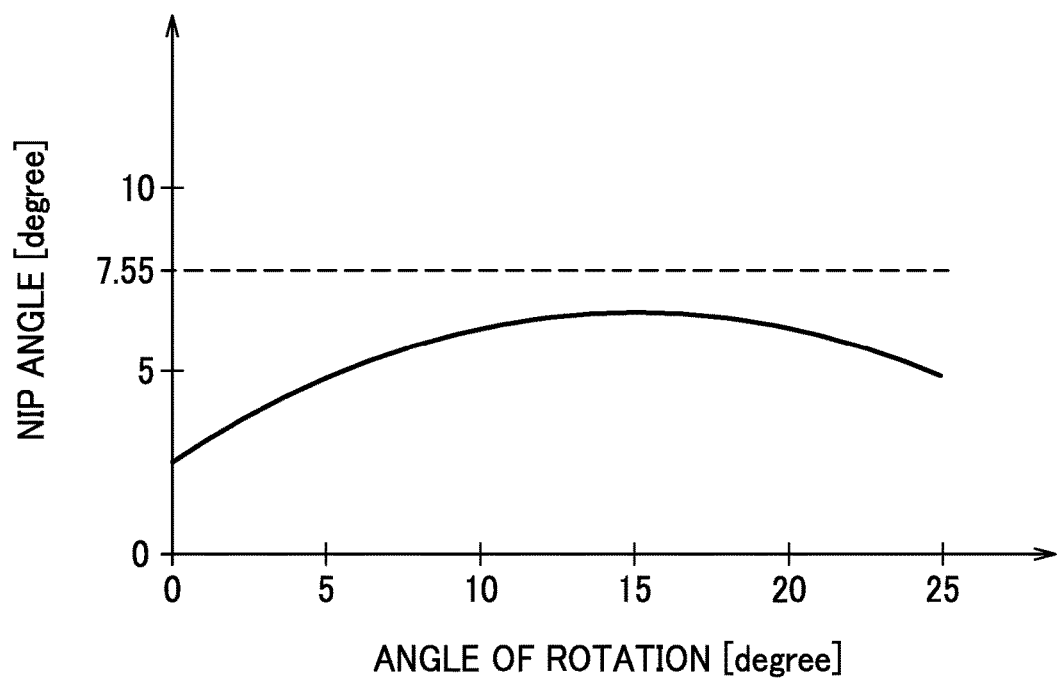
FIG. 5 is a diagram showing a relationship between the angle of rotation of the output-side rotary member and the nip angle.

As shown in FIG. 5, the second contact surface 36A, 36B is configured such that when the rotary torque is inputted to the output-side rotary member 30, a nip angle α (for the nip angle α, see FIG. 3) that a tangent plane of the second contact surface 36A, 36B at a point of contact with the roller 81 forms with the first contact surface 23A increases and subsequently decreases with increase in angle of rotation of the output-side rotary member 30 caused by the inputted rotary torque. This nip angle α preferably has a maximum value of 7.55 degrees or smaller because the nip angle in excess of 7.55 degrees would result in the situation which allows the roller 81 to slide and move easily toward a wider side in the space between the first contact surface 23A and the second contact surface 36A, 36B.

As shown in FIG. 4(b), the connecting surface region 36C includes a flat surface region 36D provided in a middle area thereof in the circumferential direction, and oblique regions 36E provided at respective end areas thereof in the circumferential direction. The flat surface region 36D is a plane perpendicular to the reference plane PL when no load is imposed on the brake shoe 20 and the output-side rotary member 30. Therefore, the flat surface region 36D is positioned parallel to the first contact surface 23A when no load is imposed on the brake shoe 20 and the output-side rotary member 30. The oblique region 36E is so inclined as to go away from the first contact surface 23A with distance from the reference plane PL, in other words, from the end of the flat surface region 36D toward the circumferentially inner end of the second contact surface 36A, 36B. Accordingly, the opposed surface 36 has a recess 36F formed by the end of the circumferentially inner end of the second contact surface 36A, 36B and the oblique region 36E, at a joint between each second contact surface 36A, 36B and the connecting surface region 36C. The distance between the first contact surface 23A and the connecting surface region 36C (flat surface region 36D) as measured when no load is imposed on the brake shoe 20 and the output-side rotary member 30 is smaller than the diameter of the roller 81. It is however to be understood that the distance between the first contact surface 23A and the connecting surface region 36C may be not smaller than the diameter of the roller 81.

As shown in FIG. 3, one pair of rollers 81 is disposed in each location between the inside surface 23 of each brake shoe 20 and each opposed surface 36 of the output-side rotary member 30. Herein, of the pair of rollers disposed between each inside surface 23 and each opposed surface 36, one which is disposed at a counterclockwise downstream side of FIG. 3 will be referred to as a roller 81A, and the other which is disposed at a clockwise downstream side of FIG. 3 will be referred to as a roller 81B. When no load is imposed on the brake shoe 20 and the output-side rotary member 30, the roller 81A is held between, and kept in contact with, the first contact surface 23A and the second contact surface 36B, and the roller 81B is held between, and kept in contact with, the first contact surface 23A and the second contact surface 36B. With this configuration in which the rollers 81 are disposed between the inside surface 23 and the opposed surface 36, in the brake device 3, a load is transmitted between the inside surface 23 and the opposed surface 36 through the rollers 81.

The springs 82 are compression coil springs, one provided between each pair of the rollers 81A, 81B. Each spring 82 is configured to separate the pair of rollers 81A, 81B from each other in the circumferential direction, and to bias them into narrower sides of the space formed between the inside surface 23 and the opposed surface 36.

The inside surface 23 and the opposed surface 36 are configured such that a rotary torque as imparted by the input-side rotary member 40 to each brake shoe 20 causes the inside surface 23 to push the opposed surface 36 through the rollers 81 and thereby causes the output-side rotary member 30 to rotate, while a rotary torque as imparted to the output-side rotary member 30 causes the opposed surface 36 to push the inside surface 23 through the rollers 81 and thereby causes the brake surfaces 21 to be pressed against the inner peripheral surface 11 of the outer race 10, thus failing to cause each brake shoe 20 to rotate. In other words, the angle of inclination and the position or the like of the second contact surfaces 36A, 36B relative to the first contact surface 23A are adjusted to make sure that the first contact surface 23A of the inside surface 23 and the second contact surfaces 36A, 36B of the opposed surface 36 stay in contact with the rollers 81 to thereby realize such a manner of operation.

The input-side rotary member 40 shown in FIG. 2 is a member configured to be rotatable about an axis of the outer race 10, the output-side rotary member 30 and other members, and capable of imparting a rotary torque to the brake shoes 20 by contacting the brake shoes 20 of the brake device 3 in the circumferential direction upon receipt of a rotary motion outputted from the ratchet device 2. The input-side rotary member 40 is configured to include a cylindrical pressure-receiving ring portion 41, a plurality of engageable legs 42 protruding from the pressure-receiving ring portion 41 to the output side, a plate portion 43 extending radially inside from a middle position or its vicinity of the pressure-receiving ring 41 in the axial direction, retaining portions 44 extending from an output-side surface of the plate portion 43 to the output side (see FIG. 7), and a through hole 45 formed in a center of the plate portion 43. The pressure-receiving ring portion 41 has an inner peripheral surface 41A which has a circular shape in cross section.

Three pairs of engageable legs 42 are provided equidistantly in positions corresponding to those of the brake shoes 20, and located between the inner peripheral surface 11 of the outer race 10 and the outer peripheral surface 22 of each brake shoe 20. Each pair of engageable legs 42 includes, as shown in FIG. 3, an engageable leg 42A disposed between the protrusion 20C and the projecting portion 20B provided at the counterclockwise downstream side thereof in FIG. 3, and an engageable leg 42B disposed between the protrusion 20C and the projecting portion 20B provided at the clockwise downstream side thereof in FIG. 3. The sizes of the projecting portions 20B, the protrusion 20C and the engageable legs 42A, 42B are determined to ensure that slight play is provided in the circumferential direction between the projecting portions 20B/the protrusion 20C and the engageable legs 42A, 42B. The respective engageable legs 42A, 42B are formed to have substantially the same shape.

The retaining portions 44 are portions provided to prevent the rollers 81 from coming off from between the inside surface 23 and the opposed surface 36, and disposed circumferentially adjacent to the rollers 81. To be more specific, the total three retaining portions 44 are provided in positions adjacent to the both sides of a pair of rollers 81A, 81B corresponding to each brake shoe 20 in the circumferential direction.

The retaining portions 44 are kept apart from the rollers 81 when no load is inputted to the input-side rotary member 40 and the output-side rotary member 40. More specifically, each retaining portion 44 is located to stay out of contact with the roller 81 adjacent to the upstream side in the direction of the rotary torque (direction of rotation), that is, the roller 81B in the present embodiment, when a normal use range of rotary torque is being inputted to the output-side rotary member 30.

Moreover, the retaining portion 44 is located to stay out of contact with the roller 81 adjacent to the downstream side in the direction of rotation, that is, the roller 81A in the present embodiment, at a point of time when the input-side rotary member 40 is caused to rotate in the same direction of rotation as that of the rotary torque of the output-side rotary member 30 from the state in which a rotary torque is inputted to the output-side rotary member 30 and is thereby caused to contact the brake shoe 20 in the circumferential direction.

Furthermore, the retaining portion 44 is located in contact with the roller 81 adjacent to the downstream side of the retaining portion 44 in the direction of rotation, when the input-side rotary member 40 comes in contact with the brake shoe 20 and causes the brake shoe 20 to rotate. It is however to be understood that the retaining portion 44 may be out of contact with the roller 81 when the input-side rotary member 40 is causing the brake shoe 20 to rotate.

Figure 7:
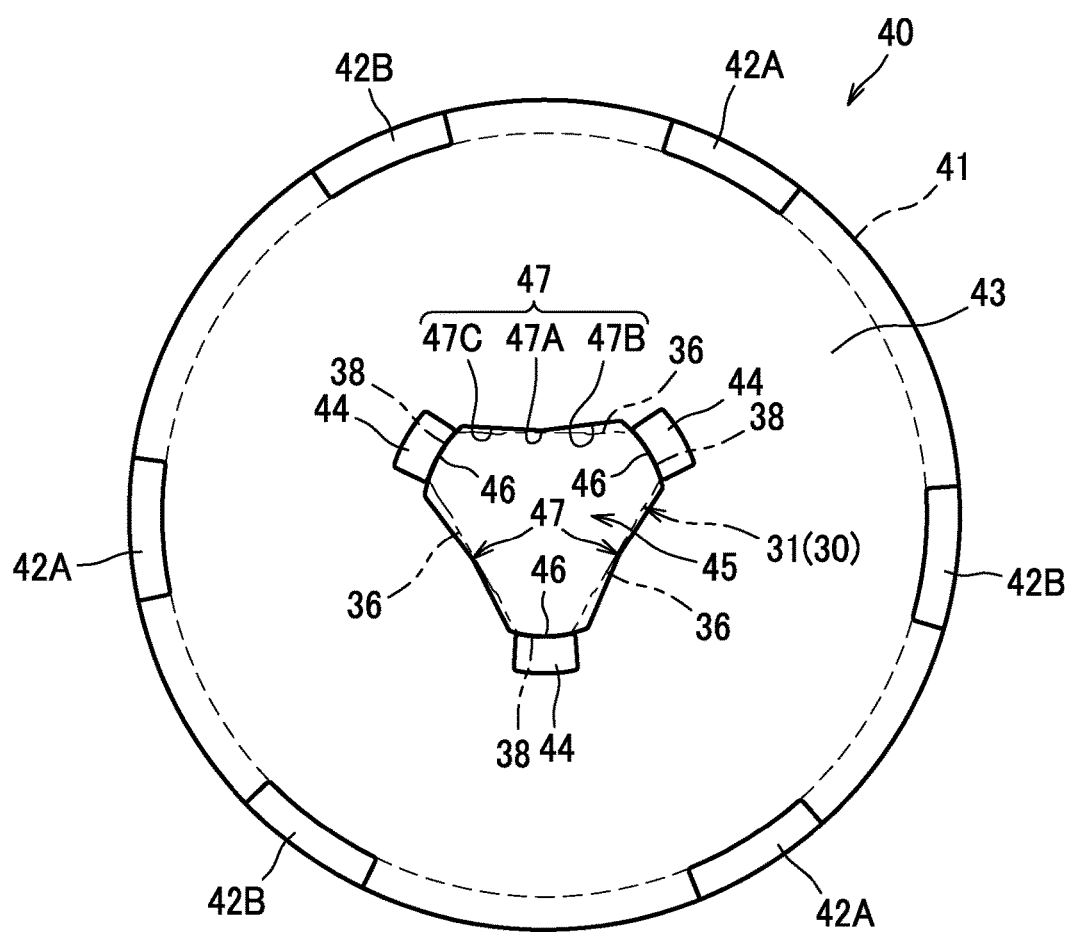
FIG. 7 is a diagram of an input-side rotary member as viewed from an output side.

As shown in FIG. 7, the through hole 45 is a structure through which the action portion 31 of the output-side rotary member 30 is insertable. The inner periphery of the through hole 45 includes three circumferential surface regions 46, and three bulging surface regions 47 disposed between each pair of adjacent circumferential surface regions 46 and bulging radially inward relative to the circumferential surface regions 46. Each bulging surface region 47 includes a top region 47A protruding to a radially innermost position, a release surface 47B adjacent to the top region 47A at the clockwise downstream side of FIG. 7 (at the counterclockwise downstream side of FIG. 3), and a relief surface 47C adjacent to the top region 47 at the counterclockwise downstream side of FIG. 7 (at the clockwise downstream side of FIG. 3).

The release surface 47B is disposed opposite to the opposed surface 36, and has a shape configured such that at a point of time when the input-side rotary member 40 is rotated in the direction of rotation (the counterclockwise direction in FIG. 3) reverse to a direction (the clockwise direction of FIG. 3) of a rotary torque (produced due to the weight of an occupant seated on the vehicle seat) being concurrently received by the output-side rotary member 30, and is brought into contact with the brake shoe 20 in the circumferential direction, a rotary torque in this reverse direction of rotation can be transmitted substantially concurrently to the opposed surface 36.

The relief surface 47C has a shape configured such that when no load is inputted from outside to the input-side rotary member 40 and the output-side rotary member 30, an angle the relief surface 47 forms with the flat surface region 36D (see FIG. 4) of the opposed surface 36 is greater than an angle the release surface 47B forms with the flat surface region 36D, and that the relief surface 47C stays out of contact with the flat surface region 36D at a point of time when the input-side rotary member 40 is rotated in the clockwise direction of FIG. 3 and brought into contact with the brake shoes 20 in the circumferential direction. It is however to be understood that the angle the relief surface 47C forms with the flat surface region 36D may be equal to the angle the release surface 47B forms with the flat surface region 36D so that the relief surface 47C may have the same function in regard to rotation in the clockwise direction of the input-side rotary member 40 shown in FIG. 3.

Figure 6:
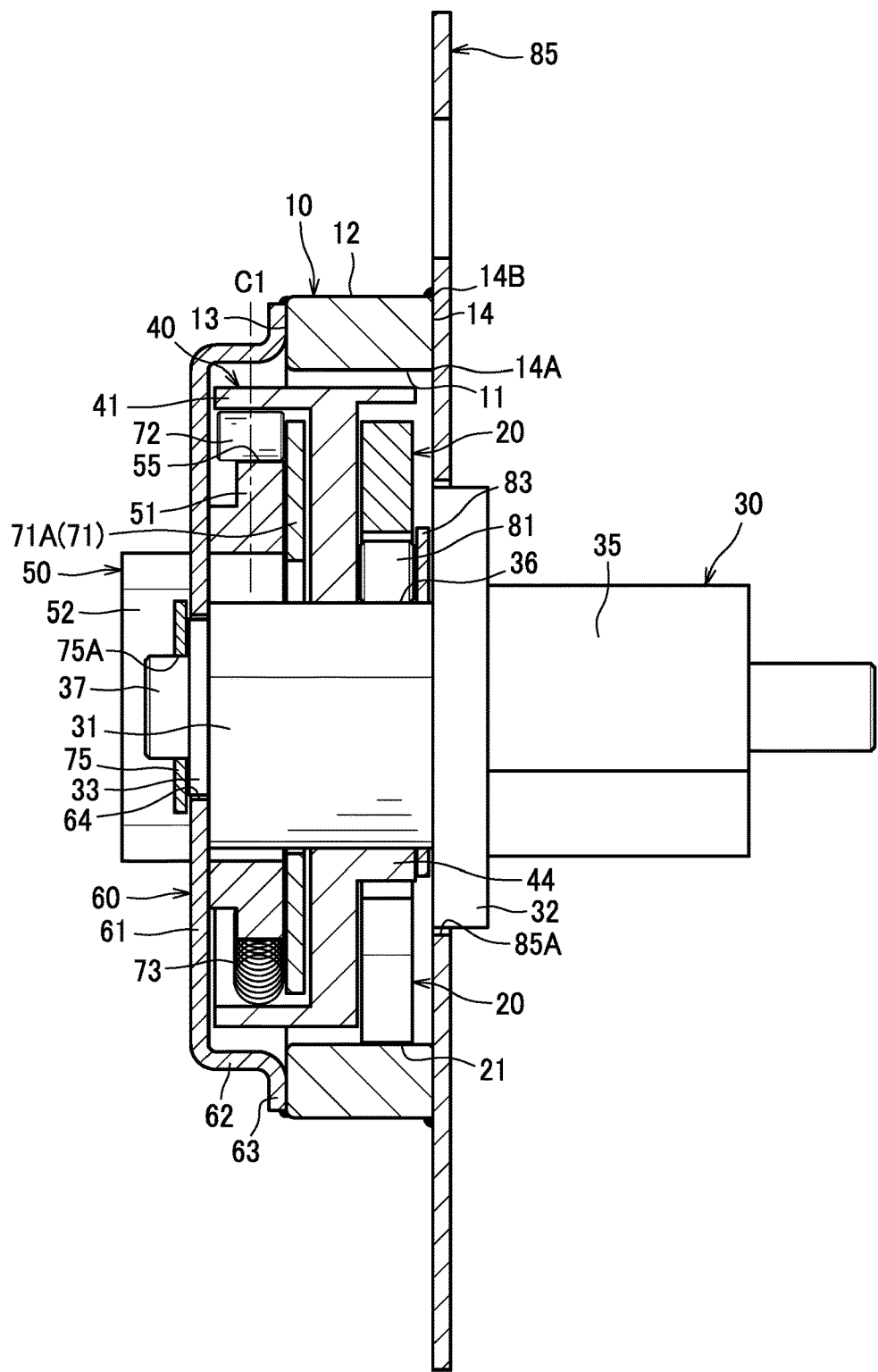
FIG. 6 is a sectional view of the clutch unit, taken along the line Z-Z of FIG. 3.

As shown in FIG. 2, the friction ring 83 is a member that produces a friction for impeding any abrupt start of the motion of the output-side rotary member 30 that would be made at a moment when the braking force of the brake device 3 is lost. The friction ring 83 includes a ring portion 83A having a hole that substantially coincides with the outer periphery of the action portion 31 of the output-side rotary member 30, and three friction-producing arms 83 each extending from the ring portion 83A radially outward and having an end portion configured to be pressed against the inner peripheral surface 11 of the outer race 10. The friction ring 83 is configured such that when the hole of the ring portion 83A is engaged with the action portion 31, the friction ring 83 rotates together with the output-side rotary member 30. As shown in FIG. 6, the friction ring 83 is disposed at the output side of the brake shoes 20.

As shown in FIG. 3, each of the friction-producing arms 83 is inclined from the radial direction toward the clockwise direction of FIG. 3. Accordingly, the friction ring 83 bites the inner peripheral surface 11 better when it rotates in the clockwise direction of FIG. 3, and thus can produce a greater frictional force, than when it rotates in the counterclockwise direction. Therefore, a specific application of the clutch unit 1 to a brake of a height adjustment mechanism for a vehicle seat S in which the clutch unit 1 is so mounted therein that rotation of the output-side rotary member 30 in the clockwise direction of FIG. 3 causes the vehicle seat S to lower may serve to effectively prevent an undesired lowering motion of the vehicle seat S.

Referring back to FIG. 2, the washer 75 is illustrated which has a hole 75A of a diameter slightly smaller than an outside diameter of the shaft portion 37 of the output-side rotary member 30, and this hole 75A is press fitted on the shaft portion 37 (see FIG. 6). The outside diameter of the washer 75 is larger than that of a support hole 64 of the cover member 60, which will be described later, so that the output-side rotary member 30 is prevented from coming off to the output side by the washer 75.

The next discussion is directed to the configuration of the ratchet device 2.

As shown in FIG. 2, the operating action receiving member 50 is a member engageable with the lever LV and swingable together with the lever LV, and configured to be movable together with the input-side rotary member 40 through the rollers 72 to thereby transmit a rotary torque from the lever LV to the input-side rotary member 40. To this end, the operating action receiving member 50 includes a cam plate portion 51, and two lever engagement portions 52 extending from the cam plate portion 51 to the input side.

Figure 8:
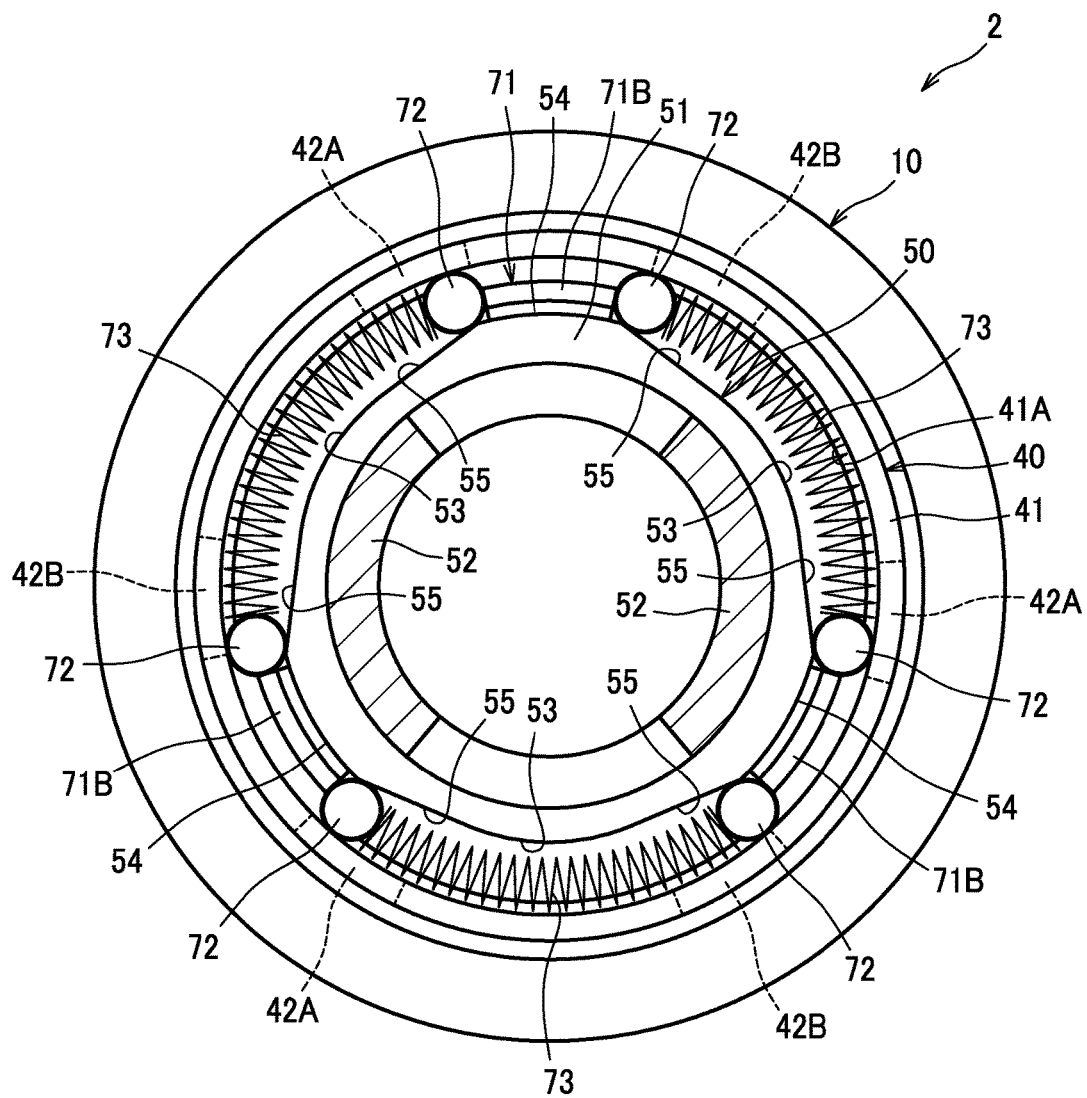
FIG. 8 is a cross section of a ratchet device.

As shown in FIG. 8, the cam plate portion 51 includes three small-radius regions 53 and three large-radius regions 54 arranged alternately on its outer peripheral surface, and flat opposed surfaces 55 are provided to connect the small-radius regions 53 and the large-radius regions 54. As there are six in-between positions at which the small-radius region 53 and the large-radius region 54 alternate, six opposed surfaces 55 are formed in positions corresponding to the in-between positions. Each opposed surface 55 is formed to vary gradually in distance from the center axis.

Rollers 72 are arranged between the respective opposed surfaces 55 and the inner peripheral surface 41A of the pressure-receiving ring portion 41. The rollers 72 are configured to engage with and disengage from the operating action receiving member 50 and the input-side rotary member 40 to thereby selectively provide and interrupt transmission of the input torque, as will become apparent from a description of the operation given later. Six rollers 72 are provided in positions corresponding to those of the opposed surfaces 55. Each opposed surface 55 has a dimension longer than half a length of the roller 72 in the axial direction, and is, as shown in FIG. 6, so arranged as to have a contact region contactable with the roller 72, which contact region spans to cover the center in the axial direction of the roller 72 (see center line C1). Therefore, the opposed surface 55 can stably hold the roller 72 between the opposed surface 55 and the pressure-receiving ring portion 41.

Referring now back to FIG. 2, the restriction member 71 is focused for discussion. The restriction member 71 is a member that restricts the position of the roller 72, and includes a sidewall portion 71A with which output-side side surfaces of the plurality of rollers 72 are covered, and three restriction portions 71B extending from the outer peripheral edge of the sidewall portion 71A to the input side. Each restriction portion 71B has a dimension longer than the length of the roller 72 in the axial direction, and has a distal end portion thereof press fitted in a corresponding engageable hole 66 provided in the cover member 60.

As shown in FIG. 8, the restriction portions 71B, in a non-active state where the lever LV is not operated, are arranged radially outside of the large-radius regions 54 in angular positions corresponding to those of the large-radius regions 54, to restrict the movement (in the circumferential direction) of the rollers 72 disposed between the opposed surfaces 55 and the pressure-receiving ring portion 41. The return springs 73 made of compression coil springs are each disposed between the two rollers 72 arranged between adjacent restriction portions 71B, and put under an initial load, respectively. Accordingly, in the non-active state of FIG. 8, each roller 72 is in contact with the restriction portion 71B. Herein, each restriction portion 71B is disposed to cover the position of the center (in the radial direction of the outer race 10) of the roller 72, and is in contact with an outermost position of the roller 72 in the circumferential direction of the outer race 10. Accordingly, the restriction portions 71B can stably support the rollers 72. It is to be understood that although the rollers 72 are so illustrated in FIG. 8 as to be in contact with the restriction portions 71B, the rollers 72 may be slightly spaced apart from the restriction portions 71B as the rollers 72 are held between the opposed surface 55 and the inner peripheral surface 41A.

As shown in FIG. 2, each of the lever engagement portions 52 has a shape of a segment of a circle in cross section and extends from the cam plate portion 51. The lever engagement portions 52 engage with the lever LV (illustration thereof is omitted).

The cover member 60 is configured to include a discal sidewall portion 61, a cylindrical outer periphery portion 62 extending from the outer peripheral edge of the sidewall portion 61 to the output side, and a flange 63 extending radially outward from an output-side end of the outer periphery portion 62. The flange 63 is, as shown in FIGS. 6 and 9, laid on the side surface 13 of the outer race 10, and welded to the side surface 13 along the outer peripheral edge thereof by laser welding. The outer race 10 is reinforced by the cover member 60 welded thereto. This welding is done all around the circumference of the flange 63.

As shown in FIG. 2, the sidewall portion 61 has a circular support hole 64 formed in its center, two arc-shaped holes 65 each extending in the form of a segment of arc around the support hole 64, and three engageable holes 66 located radially outside of the arc-shaped holes 65 and arranged equidistantly in the circumferential direction.

The support hole 64 is a structure which is fitted on the support shaft portion 33 of the output-side rotary member 30 and in which the output-side rotary member 30 is rotatably supported.

The arc-shaped holes 65 are provided in positions corresponding to those of the lever engageable portions 52 of the operating action receiving member 50, and each formed to have the shape of a segment of a circle which spans an angular range wider than that of the lever engageable portion 52. With this configuration, the arc-shaped holes 65 can receive the lever engageable portions 52 and allow the lever engageable portions 52 to move inside the arc-shaped holes 65 in a predetermined angular range.

The engageable holes 66 are configured as three through holes provided to correspond to the three restriction portions 71B of the restriction member 71, and the restriction member 71 is engaged with the cover member 60 so as not to rotate relative to the cover member 60. Engagement of the restriction member 71 with the cover member 60 in multiple positions ensures that rotation of the restriction member 71 is restricted without fail.

A description of the operation of the clutch unit 1 configured as described above is given hereinafter.

First of all, the operation of the ratchet device 2 is described.

In the neutral position as shown in FIG. 8, the rollers 72 are located between the inner peripheral surface 41A of the input-side rotary member 40 and the opposed surface 55 of the operating action receiving member 50, but with a slight gap being formed therebetween, are thus not held therebetween. The rollers 72 are pressed against the restriction portions 71B by the return springs 73. Operation of the lever LV made to cause the operating action receiving member 50 to swing clockwise to some extent causes the opposed surfaces 55 to rotate clockwise and come in contact with the rollers 72, with the result that the rollers 72 are held between the inner peripheral surface 41A and the opposed surfaces 55. This makes the operating action receiving member 50 and the input-side rotary member 40 rotatable together.

Figure 10:
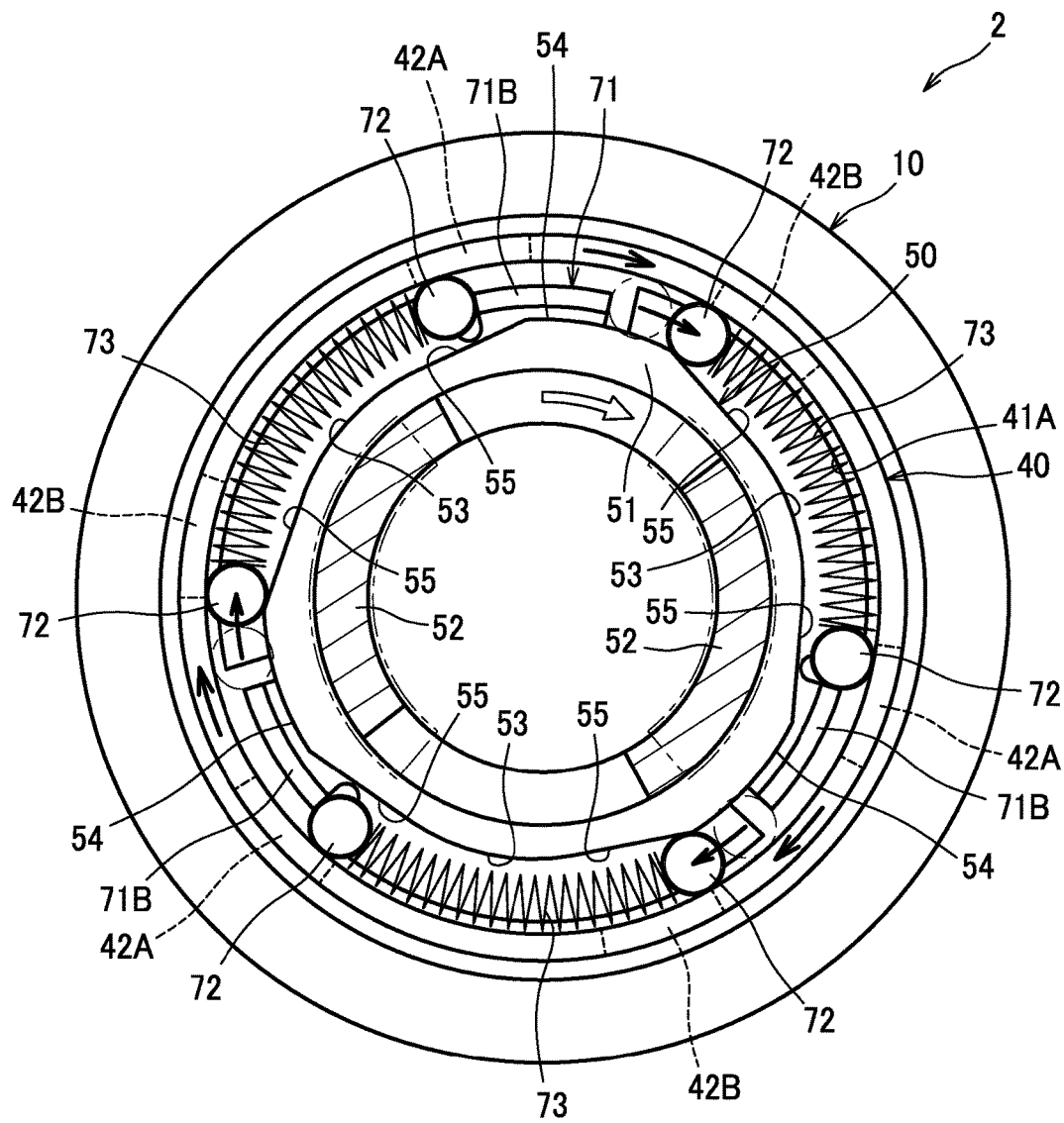
FIG. 10 is a diagram for explaining operations of the ratchet device, showing a state in which an operating action receiving member has been rotated clockwise.

Accordingly, as shown in FIG. 10, as the operating action receiving member 50 is rotated clockwise, the input-side rotary member 40 and the operating action receiving member 50 as combined together rotate clockwise. In other words, the input torque that causes the operating action receiving member 50 to rotate is transmitted to the input-side rotary member 40.

Figure 11:
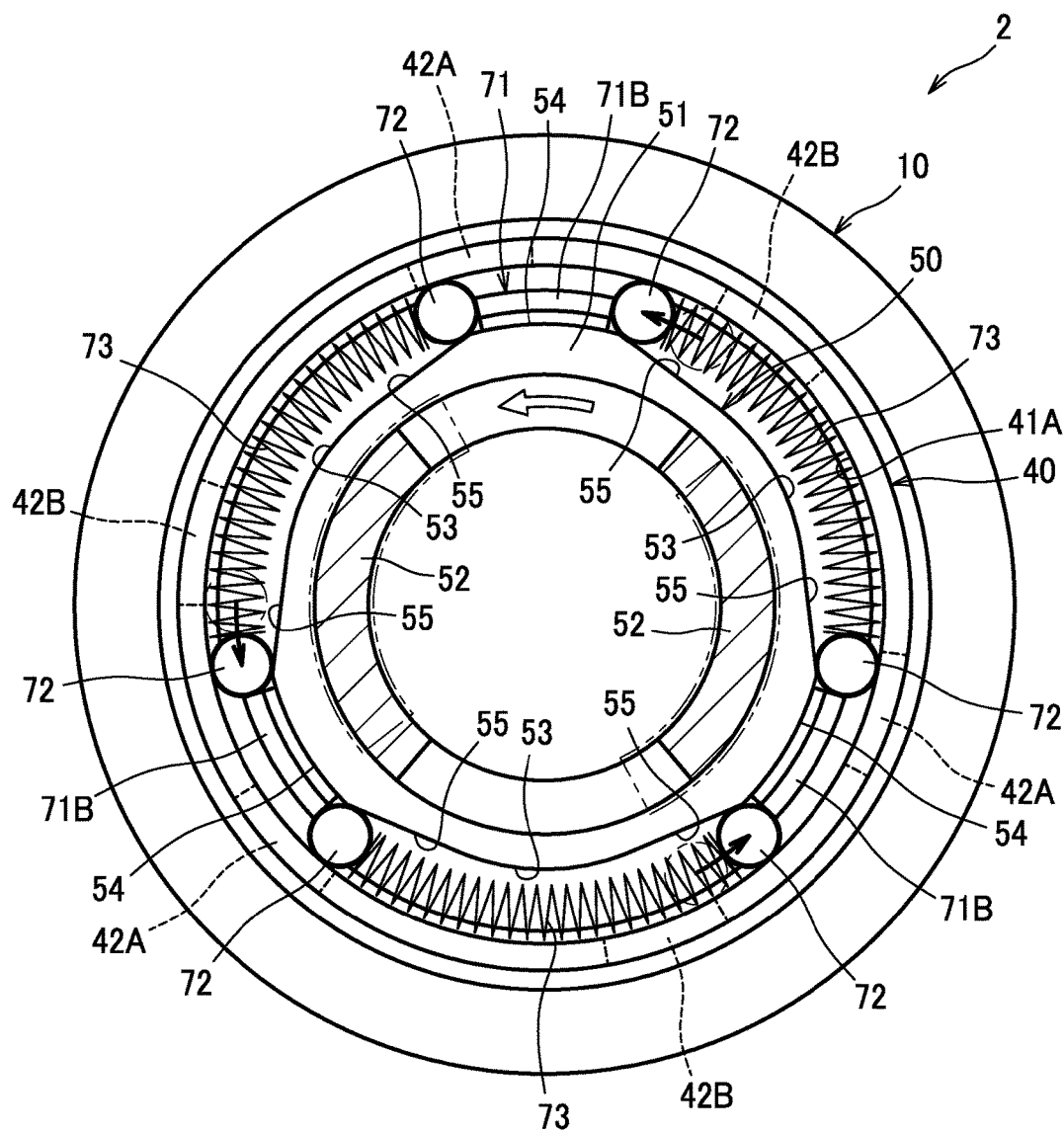
FIG. 11 is a diagram for explaining the operations of the ratchet device, showing a state in which the operating action receiving member has been rotated (back) counterclockwise.

When the lever LV is operated from the state shown in FIG. 10 to be swung counterclockwise back to the neutral position, the opposed surfaces 55 move apart from the rollers 72 in the counterclockwise direction, and thus the rollers 72 are not held by the opposed surfaces 55 and the inner peripheral surface 41A; therefore, as shown in FIG. 11, the operating action receiving member 50 rotates toward the neutral position while the input-side rotary member 40 stays still. In other words, the input torque which causes the operating action receiving member 50 to move back is not transmitted to the input-side rotary member 40 (i.e., transmission is interrupted). The operating action receiving member 50 is actuated back to the neutral position and retained in the neutral position with the assistance of the biasing forces of the return springs 73.

The operations of the lever LV being raised up from the neutral position, or returned down from the upper position back to the neutral position may proceed in the same manner as described above for the swinging-down operation, and thus a duplicate description will be omitted.

Next, the operation of the brake device 3 is described.

Figure 12:
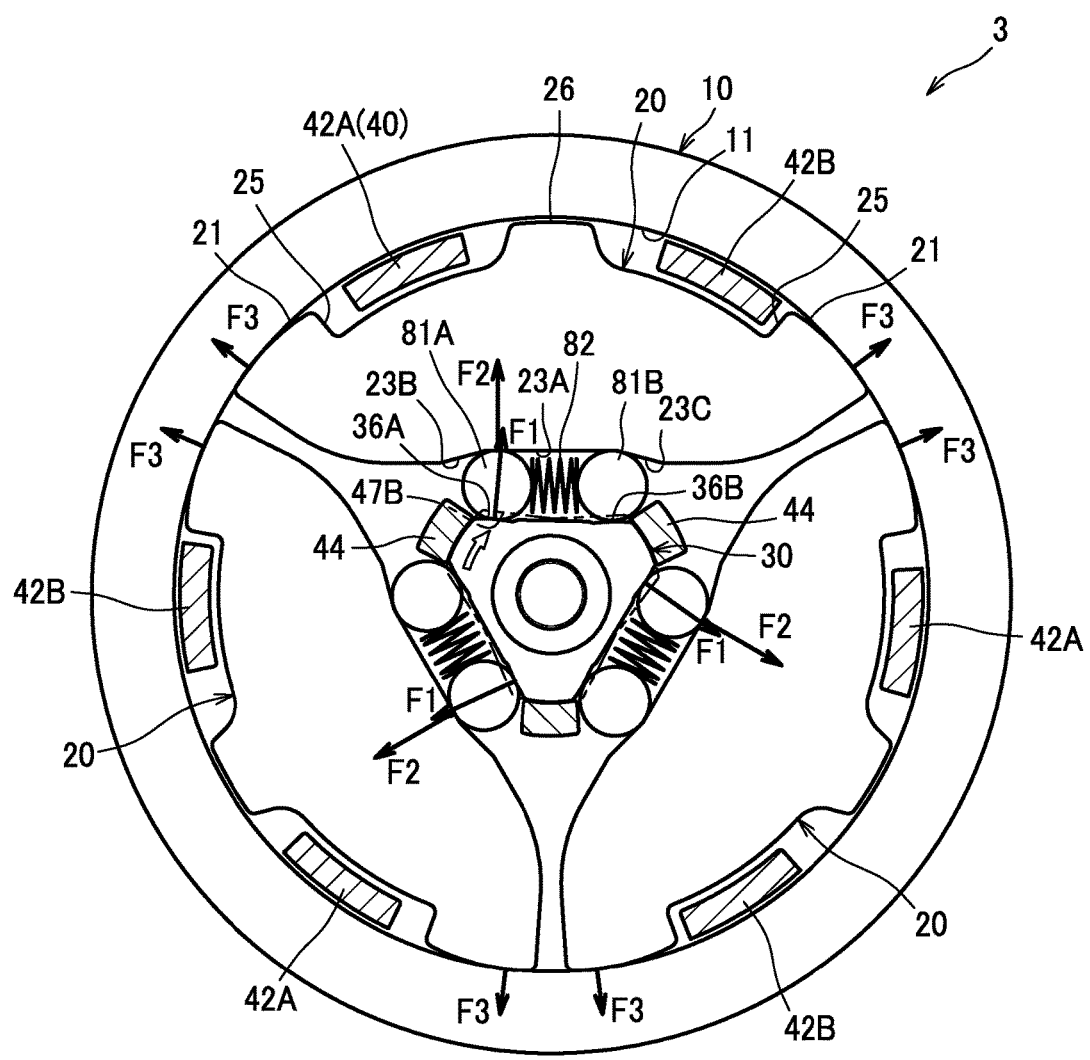
FIG. 12 is a diagram for explaining operations of the brake device, showing a state in which a clockwise rotary torque has been given to the output-side rotary member.

As shown in FIG. 12, the rotary torque in the clockwise direction (see the drawing) produced by the weight of the occupant seated on the vehicle seat S and given to the output-side rotary member 30 (i.e., a normal use range of rotary torque) causes the output-side rotary member 30 to rotate clockwise to some extent, and makes the gap between the second contact surface 36A (one of the pair of the second contact surfaces 36A, 36B of one opposed surface 36, located at the counterclockwise downstream side) and the first contact surface 23A narrower, thus increasing a pressure of the second contact surface 36A and the first contact surface 23A against the roller 81A (one of the pair of the rollers 81 corresponding to one brake shoe 20, located at the counterclockwise downstream side). Under the state in which no load is inputted to the output-side rotary member 30, if the rollers 81 are in contact with the first oblique surfaces 23B, each roller 81A rolls along between the opposed surface 36 and the inside surface 23, and moves to a position in which it comes in contact with the first contact surface 23A, and stops relative to the opposed surface 36 and the inside surface 23 as a pressure exerted against the roller 81A between the second contact surface 36A and the first contact surface 23A rises to a sufficiently high level. On the other hand, as the output-side rotary member 30 rotates clockwise, the gap between the second contact surface 36B (one of the pair of the second contact surfaces 36A, 36B of one opposed surface 36, located at the clockwise downstream side) and the first contact surface 23A becomes wider; therefore, the roller 81B (one of the pair of the rollers 81 corresponding to one brake shoe 20, located at the clockwise downstream side) is not held hard between the second contact surface 36B and the first contact surface 23A, and is allowed to roll over.

At this time, the second contact surface 36A pushes the roller 81A with a force F1, and the roller 81A pushes the first contact surface 23A with a force F2. Accordingly, a pair of brake surfaces 21 of the brake shoe 20 are pressed against the inner peripheral surface 11 of the outer race 10 with a force F3. As a result, a frictional force is produced between each brake surface 21 and the inner peripheral surface 11, and prevents the output-side rotary member 30 from rotating. In other words, a braking force which blocks the vehicle seat S from lowering is produced. Under this state in which a normal use range of rotary torque is given to the output-side rotary member 30, the support surface 26 is separate from the inner peripheral surface 11 of the outer race 10.

Also, at this time, the roller 81B is slightly spaced apart from the retaining portion 44 adjacent to a downstream side thereof in the direction of rotation of the output-side rotary member 30 (i.e., adjacent to the clockwise downstream side thereof). Accordingly, not only the roller 81A can continue to be held between the opposed surface 36 and the inside surface 23, but also the roller 81B can continue to be held between the opposed surface 36 and the inside surface 23 by the biasing force of the spring 82. Therefore, even when the brake shoes 20 are subsequently rotated in either direction, the frictional force between each brake shoe 20 and the outer race 10 can be maintained, so that an unexpected release of the braking force can be prevented.

Figure 13:
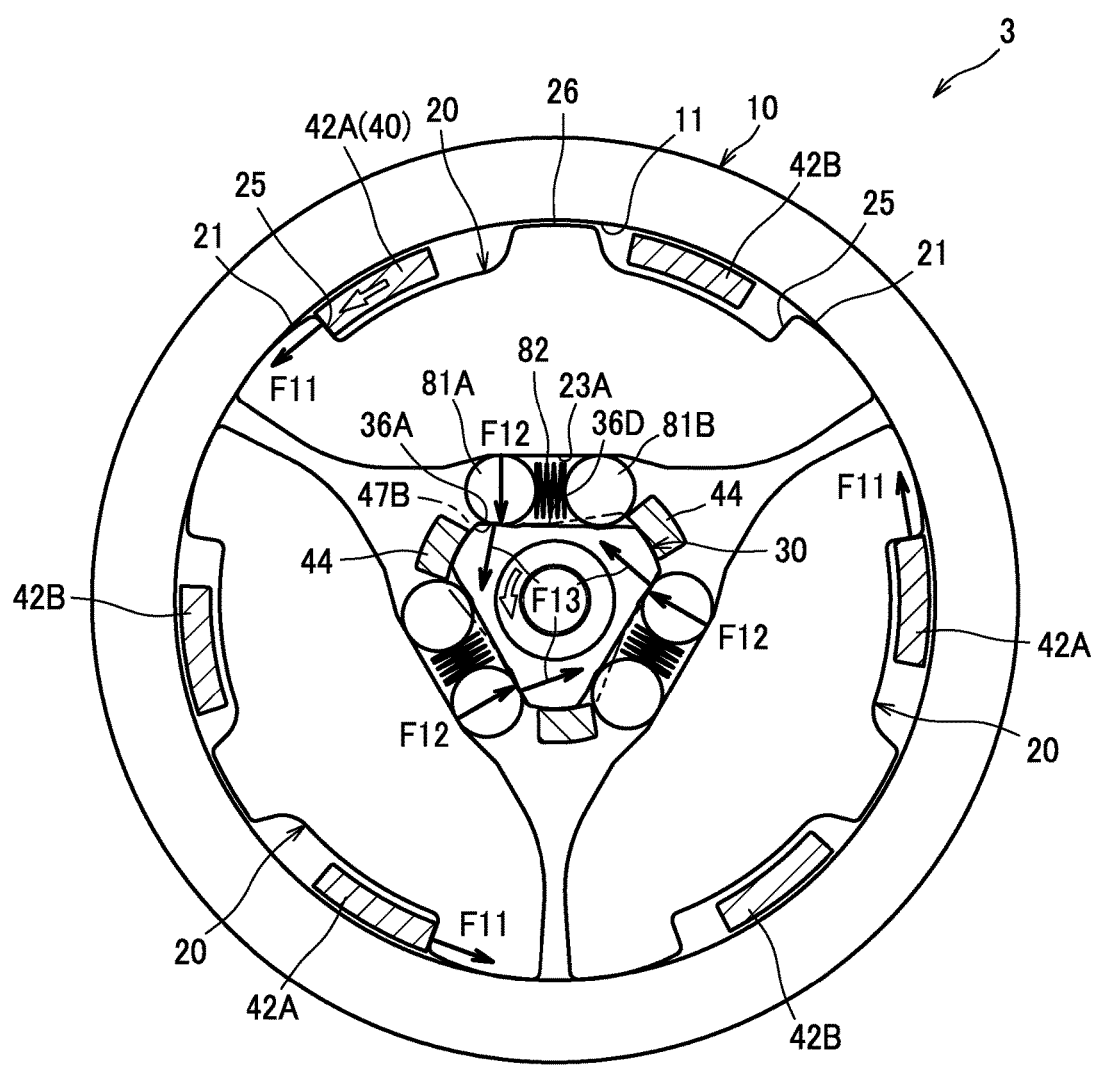
FIG. 13 is a diagram for explaining the operations of the brake device, showing a state shifted from the state shown in FIG. 12 as a result of a counterclockwise rotary torque given to the input-side rotary member.

From the state in which the brake is applied as shown in FIG. 12, when the lever LV is operated to raise the height of the vehicle seat S, and the input-side rotary member 40 is caused to rotate counterclockwise, the ends of the engageable legs 42A of the input-side rotary member 40 at the counterclockwise downstream side are, as shown in FIG. 13, brought into contact with the rotary force input surfaces 25 of the brake shoes 20 in the circumferential direction. At this point of time, the release surfaces 47B of the input-side rotary member 40 are substantially concurrently brought into contact with the flat surface regions 36D of the opposed surfaces 36, and thus made ready to transmit the counterclockwise rotary torque to the output-side rotary member 30. Accordingly, even when the brake surfaces 21 of the brake shoes 20 are pressed hard against the inner peripheral surface 11 of the outer race 10, the braking forces can be released and a feel of friction as if it scratches which would be obtrusive at a start of rotation of the input-side rotary member 40 for moving up the vehicle seat S can be reduced.

When the input-side rotary member 40 is further rotated counterclockwise, the engageable legs 42A push the rotary force input surfaces 25 with a force F11 to cause the brake shoes 20 to rotate counterclockwise, and the first contact surfaces 23A push the rollers 81A with a force F12 to cause the rollers 81A to push the second contact surfaces 36A with a force F13. At this time, as well, the support surfaces 26 are kept apart from the inner peripheral surface 11 of the outer race 10.

Figure 14:
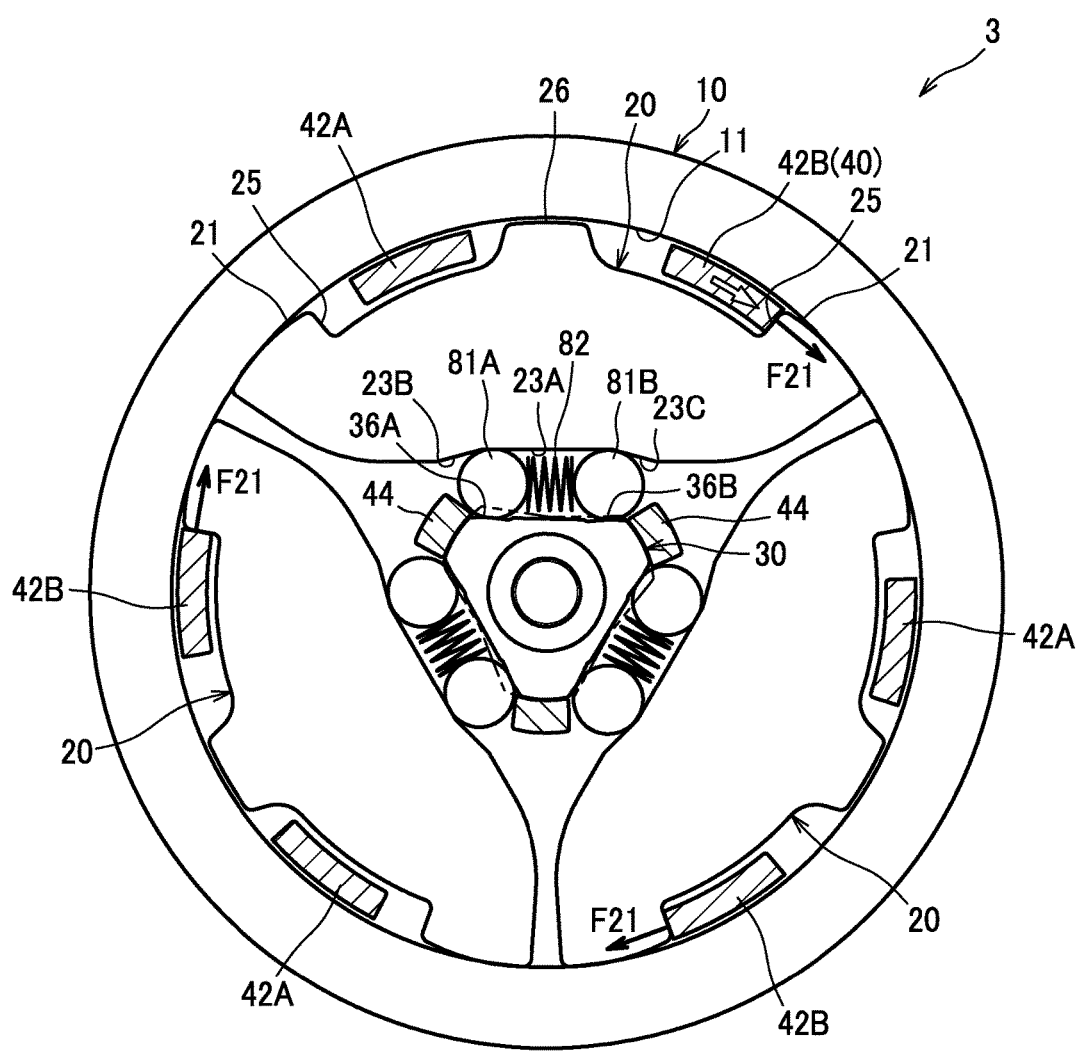
FIG. 14 is a diagram for explaining the operations of the brake device, showing a state shifted from the state shown in FIG. 12 as a result of a clockwise rotary torque given to the input-side rotary member.

From the state in which the brake is applied as shown in FIG. 12, when the lever LV is operated to lower the height of the vehicle seat S, and the input-side rotary member 40 is caused to rotate clockwise, the ends of the engageable legs 42B of the input-side rotary member 40 at the clockwise downstream side are, as shown in FIG. 14, brought into contact with the rotary force input surfaces 25 of the brake shoes 20 in the circumferential direction. At this time, the retaining portions 44 are out of contact with the rollers 81A adjacent to a downstream side thereof in the direction of rotation (i.e., adjacent to the clockwise downstream side thereof). When the input-side rotary member 40 is further caused to rotate clockwise, the engageable legs 42B push the rotary force input surfaces 25 with a force F21, and the brake shoes 20 start to rotate clockwise.

Figure 15:
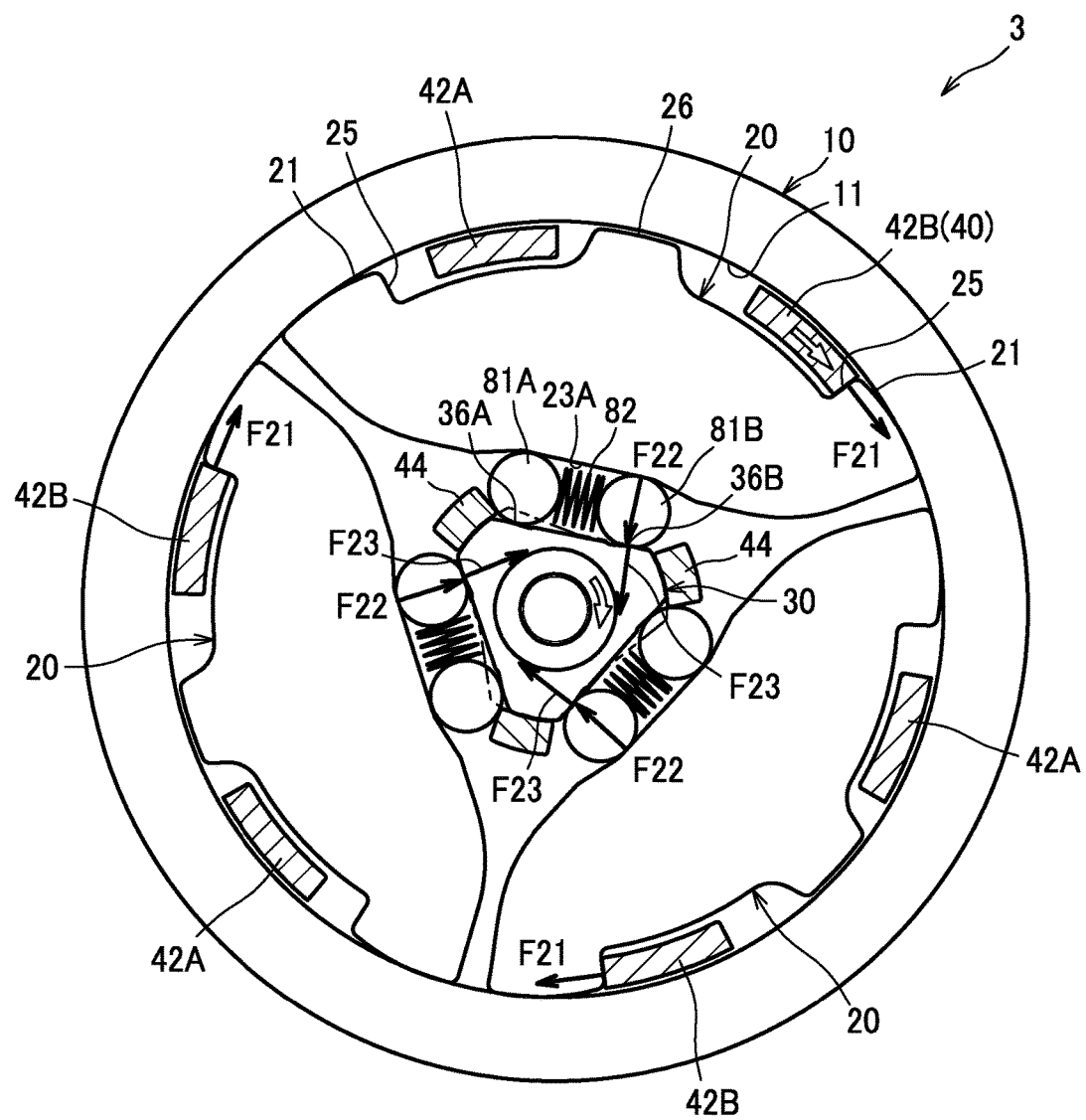
FIG. 15 is a diagram for explaining the operations of the brake device, showing a state shifted from the state shown in FIG. 14 as a result of further clockwise rotation of the input-side rotary member.

When the brake shoes 20 start rotating clockwise from the state shown in FIG. 14, the brake shoes 20 and the output-side rotary member 30 are caused to make motions relatively reverse to the motions made when the output-side rotary member 30 are caused to rotate clockwise as shown in FIG. 12. To be more specific, as shown in FIG. 15, the brake shoes 20 are caused to rotate clockwise to a small extent, and make the gap between the first contact surface 23A and the second contact surface 36B (one of the pair of the second contact surfaces 36A, 36B of one opposed surface 36, located at the clockwise downstream side) narrower, thus increasing a pressure of the first contact surface 23A and the second contact surface 36B against the roller 81A (one of the pair of the rollers 81 corresponding to one brake shoe 20, located at the clockwise downstream side). Even if the rollers 81B are in contact with the first oblique surfaces 23C, each roller 81B rolls along between the opposed surface 36 and the inside surface 23, and moves to a position in which it comes in contact with the first contact surface 23A, and stops relative to the opposed surface 36 and the inside surface 23 as a pressure against the roller 81B between the second contact surface 36B and the first contact surface 23A rises to a sufficiently high level. On the other hand, as the brake shoes 20 are caused to rotate clockwise, the gap between first contact surface 23A and the second contact surface 36A (one of the pair of the second contact surfaces 36A, 36B of one opposed surface 36, located at the counterclockwise downstream side) becomes wider; therefore, the roller 81A (one of the pair of the rollers 81 corresponding to one brake shoe 20, located at the counterclockwise downstream side) is held but with a decreasing pressure between the first contact surface 23A and the second contact surface 36A, and is thus allowed to roll over. In the state shown in FIG. 15, the retaining portions 44 are in contact with the rollers 81A adjacent to the downstream side thereof in the direction of rotation, and push the rollers 81A in the clockwise direction.

In this way, in the state shown in FIG. 14, the retaining portions 44 are out of contact with the rollers 81A, and the rollers 81A producing the braking force are not pushed by the retaining portions 44 before the rollers 81B are held with a sufficiently large force between the first contact surface 23A and the second contact surface 36B; therefore, an unexpected abatement of braking force can be prevented. On the other hand, as shown in FIG. 15, after the rollers 81B are held with a sufficiently large force between the first contact surface 23A and the second contact surface 36B, the retaining portions 44 are in contact with the rollers 81A; thus, even if the roller 81A would be lodged accidentally between the inside surface 23 and the opposed surface 36 for some reason, the braking force can be released by causing the roller 81A to be separated from between the inside surface 23 and the opposed surface 36, so that a stable operation can be realized.

As shown in FIG. 15, the engageable legs 42B push the rotary force input surfaces 25 with a force F21, the first contact surfaces 23A push the rollers 81B with a force F22, and the rollers 81B push the second contact surfaces 36B with a force F23. With this force F23, the output-side rotary member 30 is caused to rotate in the clockwise direction of the drawing. At this time, as well, the support surfaces 26 are separated from the inner peripheral surface 11 of the outer race 10.

Figure 16:
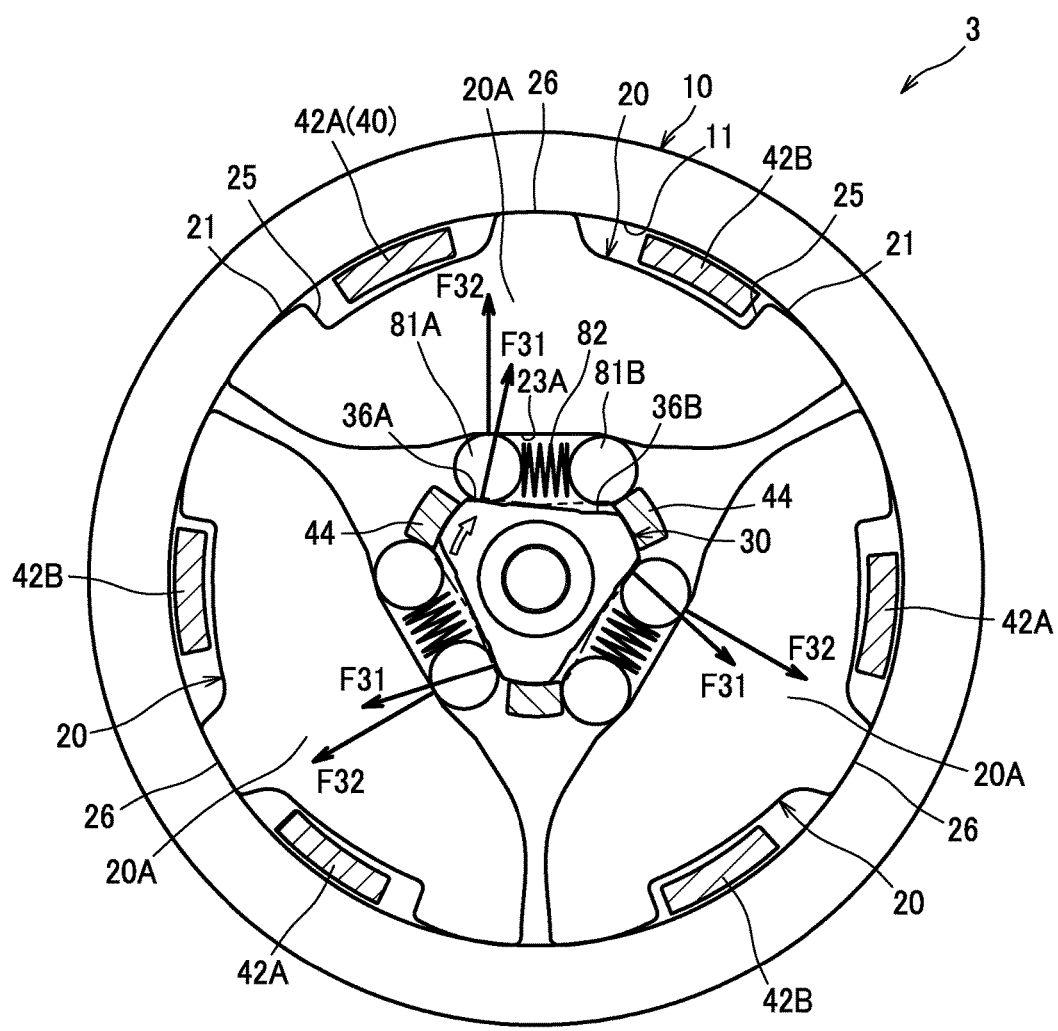
FIG. 16 is a diagram for explaining the operations of the brake device, showing a state in which an excessively large clockwise rotary torque has been given to the output-side rotary member.

On the other hand, as shown in FIG. 16, an excessive clockwise rotary torque larger than the normal use range if received by the output-side rotary member 30 causes the output-side rotary member 30 to rotate clockwise to an extent larger than that to which the output-side rotary member 30 is caused to rotate by a normal use range of the rotary torque received, and makes the gap between the second contact surface 36A and the first contact surface 23A still narrower, thus further increasing the pressure of the second contact surface 36A and the first contact surface 23A against the roller 81A. At this time, the second contact surface 36A pushes the roller 81A with a greater force F31, and the roller 81A pushes the first contact surface 23A with a greater force F32. This causes the brake shoe 20 to deform to have the main body portion 20A bowed radially outward, and causes the support surface 26 to come in contact with the inner peripheral surface 11 of the outer race 10. As a result, the brake shoe 20 is supported at the support surface 26 by the outer race 10, and constrained from deform further, so that a load stress imposed on the brake shoe 20 can be reduced.

When the output-side rotary member 30 receives an excessive clockwise rotary torque and is caused to rotate clockwise to a large extent, the gap between the second contact surface 36B and the first contact surface 23A may be widen to make the roller 81B unconstrained therebetween. In this situation, the roller 81B may contact the retaining portion 44 adjacent thereto at the downstream side of the direction of rotation (herein, clockwise direction). In this way, the retaining portion 44 supports the roller 81B, and makes the roller 81 unlikely to come off from between the inside surface 23 and the opposed surface 36.

Hereinabove described is a situation in which after a clockwise rotary torque received by the output-side rotary member 30 causes a braking force to be produced, the input-side rotary member 40 is caused to rotate clockwise or counterclockwise. When the clutch unit 1 is applied to the vehicle seat S, the output-side rotary member 30 only receives the clockwise rotary torque, and thus the operation should be followed as described above without exception; however, arguendo a counterclockwise rotary torque were received by the output-side rotary member 30, a braking force being produced, and then the input-side rotary member 40 would be caused to rotate clockwise or counterclockwise, the operation is to be followed in a similar manner with the only difference in the direction of rotation, because the brake shoe 20, the output-side rotary member 30 and the input-side rotary member 40 are arranged in a mirror symmetry (axial symmetry in FIG. 3).

In the brake device 3 applied to the clutch unit 1 according to the present embodiment as described above, a rotary torque as imparted to the output-side rotary member 30 causes the rollers 81 to push the inside surfaces 23 of the brake shoes 20 and thereby causes the brake surfaces 21 to be pressed against the inner peripheral surface 11 of the outer race 10, thus failing to cause the brake shoes to rotate. In this state, if the brake shoes 20 are caused to rotate via the input-side rotary member 40 in one direction of rotation or in the other direction of rotation, the state such that there can be any of the rollers 81 being held between, i.e., kept in contact with, the inside surface 23 and the opposed surface 36 of the output-side rotary member 30 can be maintained, because the rollers 81 are biased into the narrower sides of the space formed between the inside surface 23 and the opposed surface 36. Therefore, an abrupt loss of the braking force can be made unlikely to occur. In addition, since a plurality of the brake shoes 20 arranged in the circumferential direction, individually, can produce braking forces by themselves, the upsizing of the brake device 3 in the axial direction can be prevented. With these features, the size in the axial direction can be reduced and a stable operation can be exercised.

Moreover, since the rollers 81 are held between, and kept in contact with, the first contact surface 23A of the inside surface 23 and the second contact surfaces 36A, 36B (of the opposed surface 36) inclined with respect to the first contact surfaces 23A, the rollers 81 can be held stably and the backlash of the rollers 81 can be suppressed.

As described above, if a rotary torque is given to the output-side rotary member 30 and causes the output-side rotary member 30 to rotate to some extent, so as to make a distance between the first contact surface 23A and the second contact surface 36A, 36B narrower, then, the pressure against the rollers 81 effected between the first contact surface 23A and the second contact surfaces 36A, 36B increases. From this state, when the output-side rotary member 30 further rotates due to an excessively large amount of the given rotary torque or other circumstances, then an alternative flat-design second contact surface, if adopted, would possibly render an angle between the first contact surface and the second contact surface greater, or so great as to cause the roller to move toward the wider side of the space formed between the first contact surface and the second contact surface, reducing the pressure, thus lowering the braking force, as the case may be. On the other hand, according to the present embodiment, the second contact surface 36A, 36B is configured to have a curved region bulging toward the brake shoe 20, so that even when the output-side rotary member 30 further rotates, the angle between the first contact surface 23A and the second contact surface 36A, 36B (to be more specific, the tangent plane of the second contact surface 36A, 36B at a point of contact with the roller 81) can be restrained from increasing, and maintained within an appropriate range. Accordingly, the roller 81 can be restrained from moving toward a wider side of the space between the first contact surface 23A and the second contact surface 36A, 36B, so that the roller 81 can be continuously held between the first contact surface 23A and the second contact surface 36A, 36B (i.e., kept under high pressure). Consequently, the braking force can be maintained, and the braking force can be produced stably.

Particularly, in the present embodiment, the second contact surface 36A, 36B has radii of curvature decreasing with distance from the reference plane PL; therefore, even if the output-side rotary member 30 further rotates, the angle between the first contact surface 23A and the second contact surface 36A, 36B can be more effectively prevented from increasing and maintained within the appropriate range. Moreover, according to the present embodiment, the nip angle α increases and subsequently decreases with increase in angle of rotation of the output-side rotary member 30; therefore, excessive increase in the nip angle α can be prevented, so that the roller 81 can be prevented from slipping in a space between the first contact surface 23A and the second contact surface 36A, 36B. Accordingly, the roller 81 can advantageously be retained to be held between the first contact surface 23A and the second contact surface 36A, 36B, so that the braking force can be produced more stably.

Since the second contact surface 36A, 36B is provided one in each of the two outer ends of the opposed surface 36, the configuration in which a rotary torque given to the output-side rotary member 30 fails to cause the brake shoe 20 to rotate in both of the one direction of rotation and the other direction of rotation can be realized.

Since the opposed surface 36 includes the connecting surface region 36C, a space can be provided between the roller 81A contactable with one second contact surface 36A and the roller 81B contactable with the other second contact surface 36B. With this configuration, the spring 82 to be disposed in this space can be placed with ease.

Furthermore, since the opposed surface 36 has the recess 36F at a joint between each second contact surface 36A, 36B and the connecting surface region 36C, the roller 81 can be installed along the recess 36F with the help of the recess 36F as a visible indication, and the roller 81 after installation can be fitted and temporarily retained in the recess 36F, so that the spring 82 can be installed between the two rollers 81. In short, in this brake device 3, the rollers 81 and the springs 82 can be installed with increased ease.

Since the connecting surface region 36C includes a flat region 36D that is planer in shape, an appropriately sized space can be provided between the connecting surface region 36C and the brake shoe 20 without fail, in comparison with an alternative configuration in which the connecting surface region 36C includes a surface protruding toward the brake shoe side instead of the flat surface region 36D or another configuration in which the connecting surface region 36C includes a surface recessed toward a side opposite to the brake shoe side. Accordingly, the spring 82 to be disposed in this space can be easily installed therein.

Since the movable element is configured as a roller 81, the surface area of contact thereof with the inside surface 23 and the opposed surface 36 is larger than an alternative configuration in which the movable element is a ball, so that the load-carrying capacity can be made greater. Moreover, the movable element configured as the roller 81 can be operable more smoothly than an alternative configuration in which the moving element is configured as a polygon, so that a stable operation can be realized.

Furthermore, when the inside surface 23 of the brake shoe 20 is pushed radially outward through the rollers 81 by the opposed surface 36 of the output-side rotary member 30 to which an excessive rotary torque is imparted, the support surface 26 of the brake shoe 20 comes in contact with the inner peripheral surface 11 of the outer race 10; therefore, the load imposed on a portion of the brake shoe 20 between the pair of brake surfaces 21 can be supported by the outer race 10. With this feature, the load stress imposed on the brake shoe can be reduced.

Furthermore, the support surface 26 is kept apart from the inner peripheral surface 11 when no load is imposed on the brake shoe 20; therefore, when no excessively large rotary torque is given to the output-side rotary member 30, that is, when a normal use range of the rotary torque is given to the output-side rotary member 30, the braking force is produced at one pair of the brake surfaces 21 provided at two ends of the outer periphery of the brake shoe 20 in the circumferential direction, so that the braking force to be produced can be stabilized. On the other hand, when an excessively large rotary torque is given to the output-side rotary member 30 and causes the support surface 26 to contact the inner peripheral surface 11, an excessively large deformation of the brake shoe 20 can be suppressed, and the force from the opposed surface 36 is thus received reliably by the inside surface 23, so that a large braking force can be produced. Also, when a normal range of the rotary torque given to the brake shoe 20 in the circumferential direction by the input-side rotary member 40 causes the brake shoe 20 to rotate, the support surface 26 and the inner peripheral surface 11 will not rub against each other, so that wearing of the support surface 26 and other parts can be suppressed, and a smooth operation can be expected.

Since the brake shoe 20 includes a protrusion 20C on which the support surface 26 is provided, the rigidity of the brake shoe 20 can be enhanced. Thanks to this enhanced rigidity of the brake shoe 20, the load stress imposed on the brake shoe 20 can be reduced more effectively. Also, when the support surface 26 contacts the inner peripheral surface 11, the position of the support surface 26 which contacts the inner peripheral surface 11 is invariable, so that more stable operation can be expected.

Since the support surface 26 is provided in the middle position between the pair of brake surfaces 21, the position of the brake shoe 20 in which the bending stress represents the maximum when the support surface 26 contacts the inner peripheral surface 11 can be supported. Therefore, the load stress imposed on the brake shoe 20 can be reduced more effectively.

Since the support surface 26 has a shape contoured to fit the inner peripheral surface 11, the brake shoe 20 can be thereby supported stably when the support surface 26 contacts the inner peripheral surface 11. Accordingly, the load stress imposed on the brake shoe can be reduced more effectively.

Second Embodiment

Next, a second embodiment of the present invention is described. In describing the second embodiment, only the particular aspects different from those of the first embodiment are elaborated, and a description of the similar aspects will be omitted.

Figure 17:
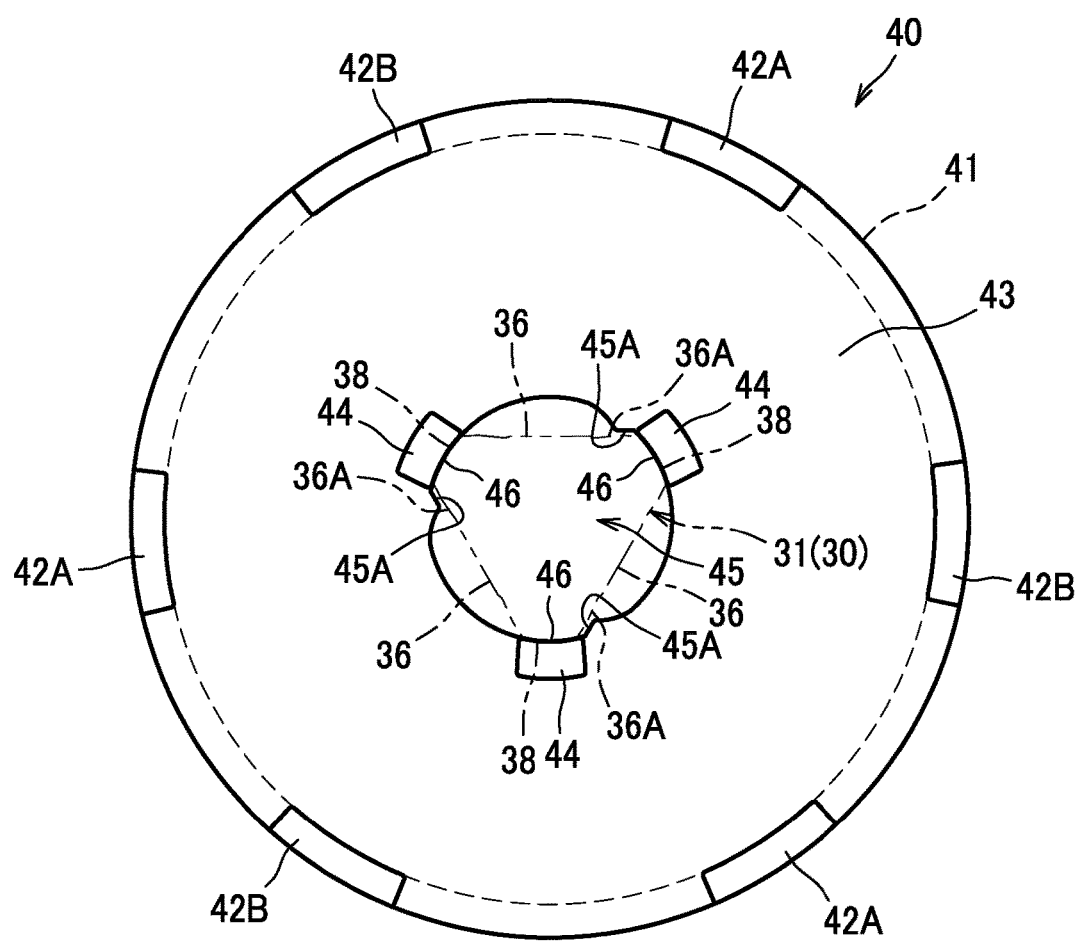
FIG. 17 is a diagram of an input-side rotary member according to a second embodiment, as viewed from an output side.
Figure 18:
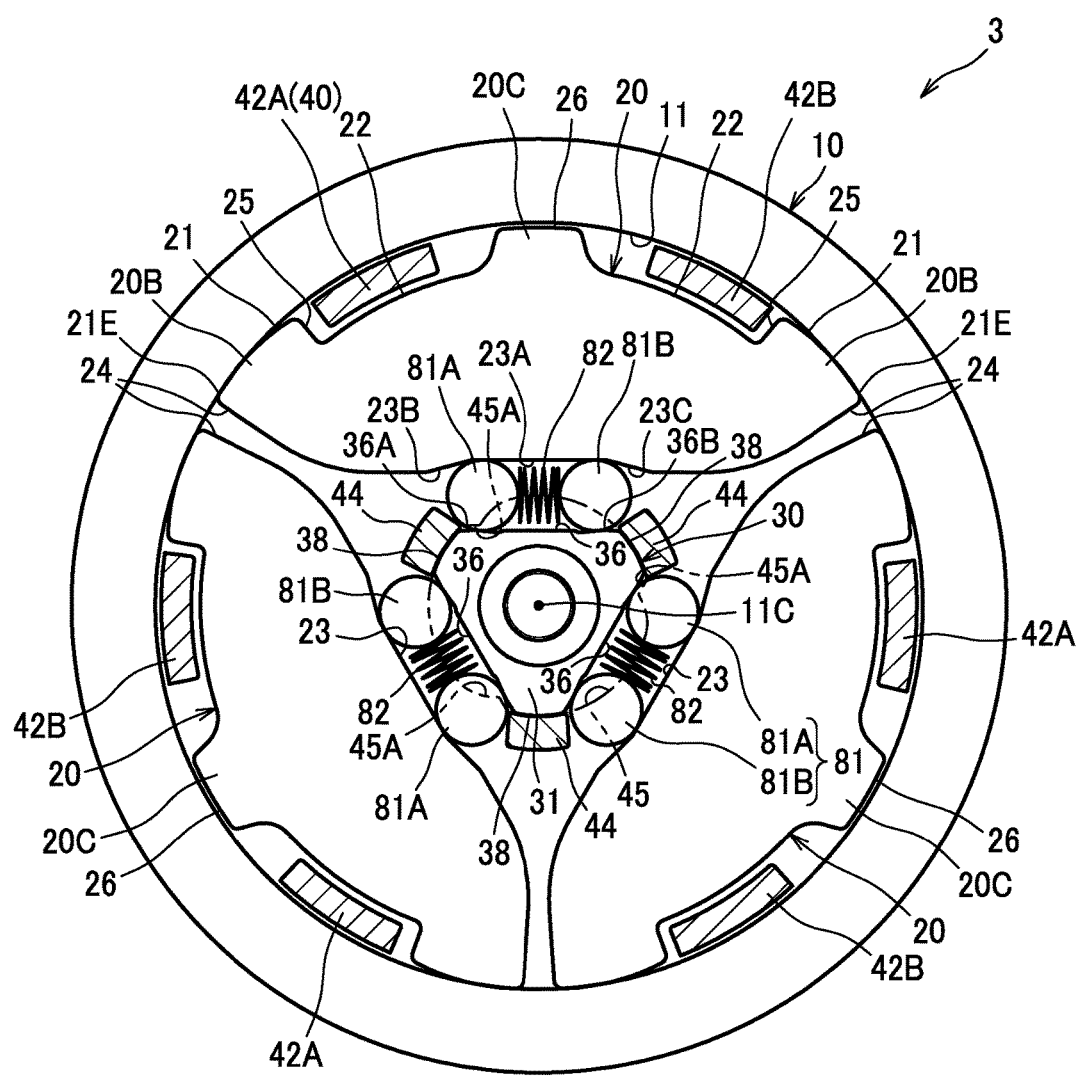
FIG. 18 is a cross section of a brake device according to the second embodiment.

As shown in FIGS. 17 and 18, the input-side rotary member 40 has a through hole 45 contoured to have a substantially circular shape, and three engageable portions 45A are protrusively formed at an inner peripheral surface thereof. The engageable portions 45A are arranged equidistantly in the circumferential direction, and disposed adjacent to the counterclockwise downstream sides (in FIG. 17; clockwise downstream sides in FIG. 18) of the second contact surfaces 36A. Accordingly, the input-side rotary member 40 is configured such that the engageable portions 45A are engageable with the action portion 31 of the output-side rotary member 30 in the circumferential direction, and thus can transmit a rotary torque to the output-side rotary member 30.

The engageable legs 42A and the retaining portions 44 protruding toward the output side are slightly different from those of the first embodiment in location and size. To be more specific, the retaining portions 44 are slightly larger than those of the first embodiment in the circumferential dimension. The engageable legs 42A and the engageable portions 45A are arranged such that engagement of the engageable portions 45A with the output-side rotary member 30 occurs prior to engagement of the engageable legs 42A of the input-side rotary member 40 with the brake shoes 20, when the input-side rotary member 40 is rotated in a direction reverse to the rotary torque concurrently inputted to the output-side rotary member 30 and borne by a braking force of the brake shoes 20.

The next discussion is directed to the operation and advantageous effects of the brake device 3 configured as described above.

Figure 19:
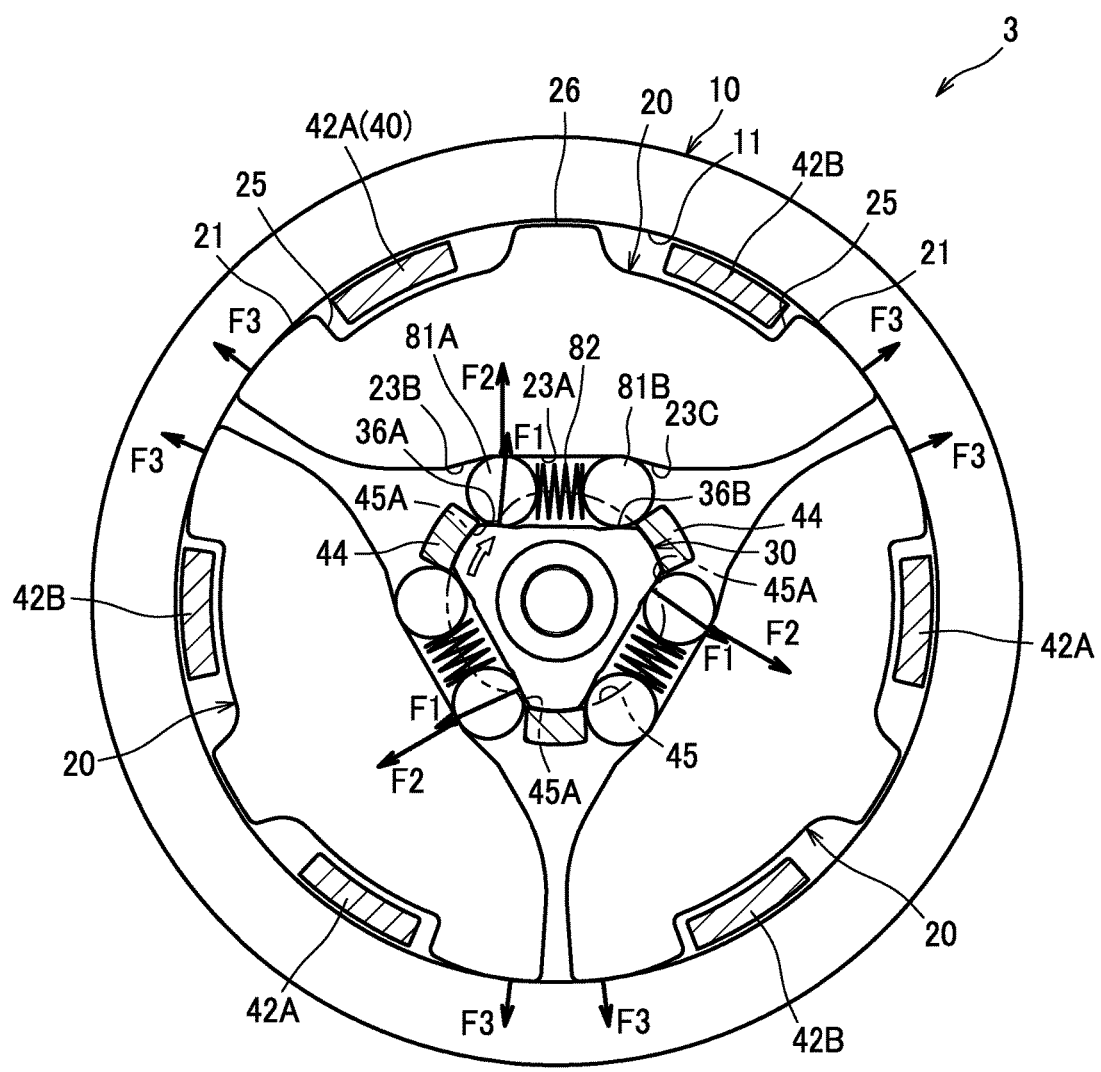
FIG. 19 is a diagram for explaining operations of the brake device according to the second embodiment, showing a state in which a clockwise rotary torque has been given to an output-side rotary member.

Starting from the state as shown in FIG. 18 in which no load is imposed on the brake device 3, once a clockwise rotary torque (see the drawing) derived from the weight of an occupant seated on the vehicle seat S is imparted to the output-side rotary member 30, the output-side rotary member 30 is caused to rotate clockwise to a small extent. Then, as shown in FIG. 19, the second contact surfaces 36A push the rollers 81A with a force F1, and the rollers 81A push the first contact surfaces 23A with a force F2. Accordingly, the pair of brake surfaces 21 of each brake shoe 20 are pressed against the inner peripheral surface 11 of the outer race 10 with a force F3. As a result, a frictional force is produced between the brake surfaces 21 and the inner peripheral surface 11, and the output-side rotary member 30 does not rotate. That is, a braking force that prevents the vehicle seat S from lowering is produced.

At this time, the roller 81B is kept apart slightly from the retaining portion 44 adjacent thereto at its downstream side in the direction of rotation of the output-side rotary member 30, i.e., at the clockwise downstream side. Accordingly, not only the roller 81A is held between the opposed surface 36 and the inside surface 23, but also the roller 81B can be retained to be held between the opposed surface 36 and the inside surface 23 by the biasing force of the spring 82. Therefore, even when the brake shoes 20 are subsequently caused to rotate in either direction, the frictional force between each brake shoe 20 and the outer race 10 can be maintained, and thus an unexpected loss of braking force can be made unlikely to occur.

The operations described hereinabove is the same as those of the first embodiment (see FIG. 12).

Figure 20:
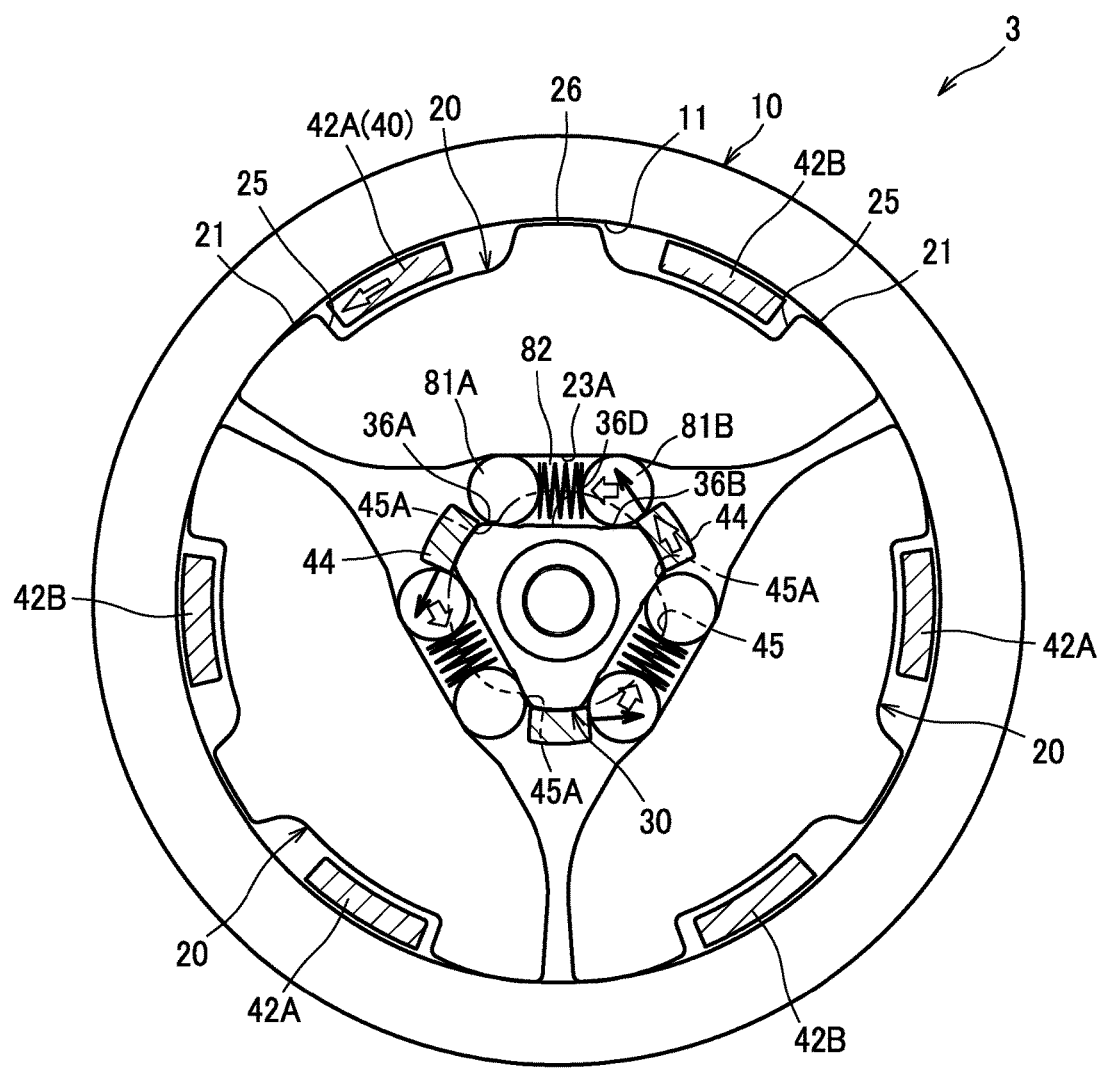
FIG. 20 is a diagram for explaining the operations of the brake device according to the second embodiment, showing a state shifted from the state shown in FIG. 19 as a result of a counterclockwise rotary torque given to an input-side rotary member, which has caused each one of paired rollers to be released.

When the lever LV is operated to raise the height of the vehicle seat S from the state of FIG. 19 in which the brake is applied, the retaining portions 44 come in contact with the rollers 81B as shown in FIG. 20 and the state in which each roller 81B is held between the first contact surface 23A and the second contact surface 36B by the biasing force of the spring 82 is released.

Figure 21:
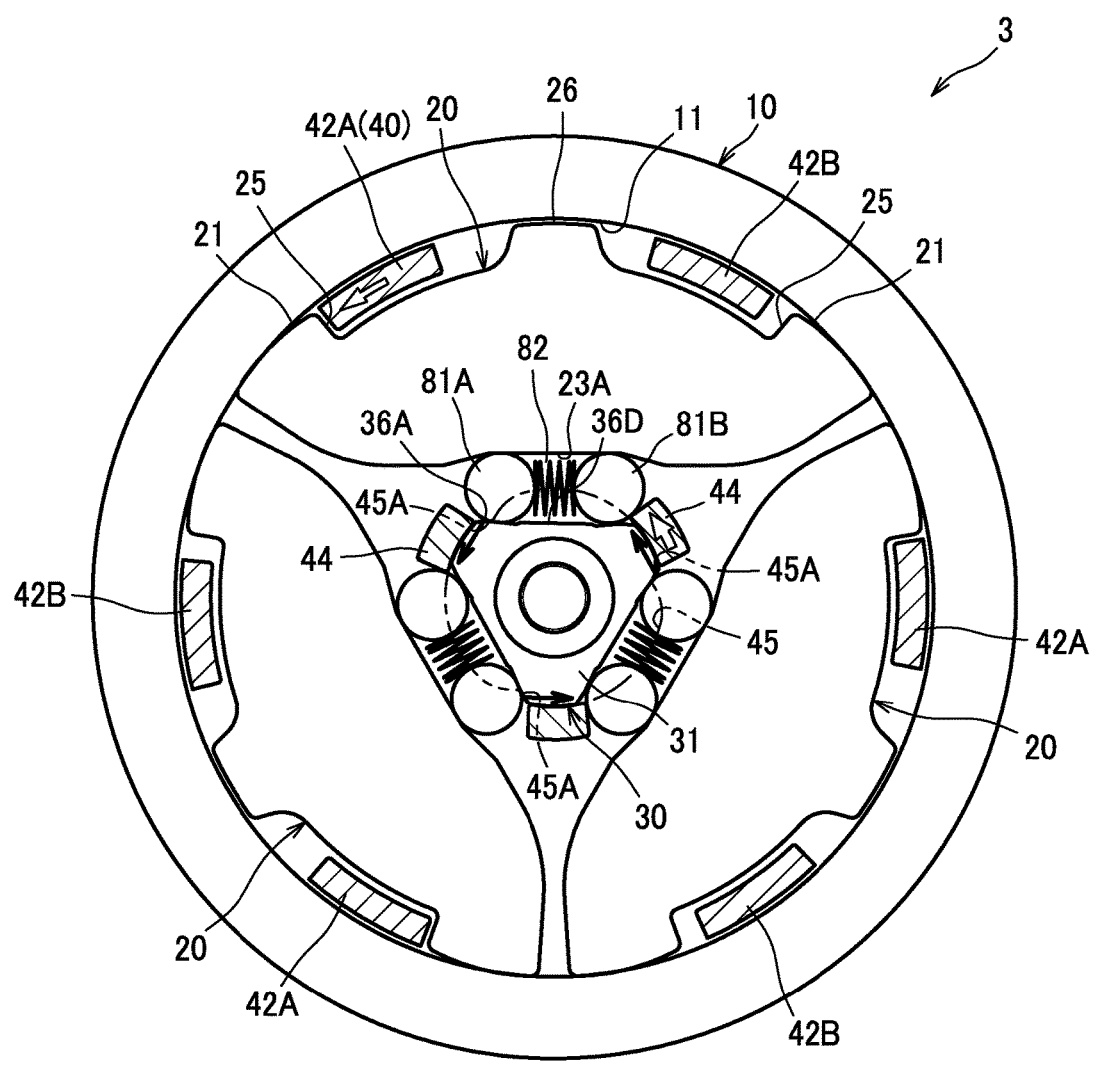
FIG. 21 is a diagram for explaining the operations of the brake device according to the second embodiment, showing a state shifted from the state shown in FIG. 20 as a result of a further counterclockwise rotary torque given to the input-side rotary member, which has caused engageable portions to engage with the output-side rotary member.

When the input-side rotary member 40 in the state of FIG. 20 is further caused to rotate counterclockwise, the engageable portions 45A engage with the action portion 31 of the output-side rotary member 30 as shown in FIG. 21. Accordingly, even when the output-side rotary member 30 tends to rotate clockwise, the engageable portions 45A support the action portion 31, and the output-side rotary portion 30 thus fails to rotate. In other words, the likelihood of unexpected rotation of the output-side rotary member 30 and the resultant slipping down of the seat cushion S1 is reduced.

Then, the engageable portions 45A push the action portion 31, and cause the output-side rotary member 30 to rotate. Accordingly, the state in which each roller 81A is held between the first contact surface 23A and the second contact surface 36A to thereby produce a braking force is released. In other words, the rotation of the output-side rotary member 30 starts simultaneously with the release of the braking force through the rollers 81A, thus without the need of a large load which would be required upon startup of the rotation of the output-side rotary member 30; therefore, a feel of friction as if it scratches which would be received upon startup of the rotation can be reduced.

Figure 22:
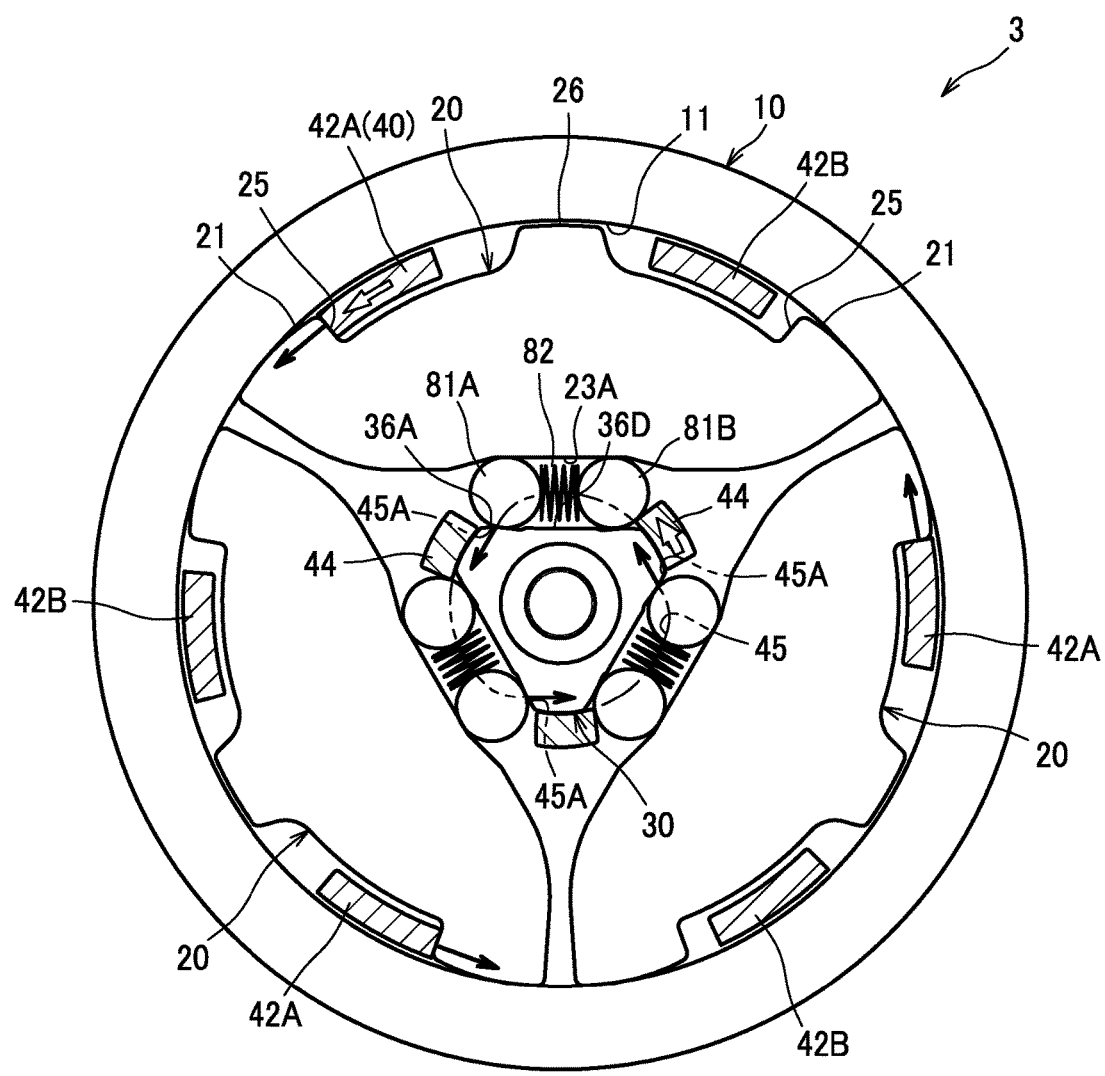
FIG. 22 is a diagram for explaining the operations of the brake device according to the second embodiment, showing a state shifted from the state shown in FIG. 21 as a result of a further counterclockwise rotary torque given to the input-side rotary member, which has caused engageable legs to engage with brake shoes.

When the input-side rotary member 40 in the state of FIG. 21 is further caused to rotate counterclockwise, the counterclockwise downstream ends of the engageable legs 42A of the input-side rotary member 40 come in contact with the rotary force input surfaces 25 of the brake shoes 20 in the circumferential direction as shown in FIG. 22. Accordingly, the brake shoes 20 are caused to start rotating counterclockwise. As seen in FIG. 20 to FIG. 21, the retaining portions 44 push and move the rollers 81B, causing the roller 81A and the roller 81B to get closer to each other; however, from the state shown in FIG. 22, the rollers 81A are caused to rotate counterclockwise according as the brake shoes 20 rotate, so that the sticking of the spring 82 which would result from the excessively close proximity of the roller 81A and the roller 81B can be prevented.

Figure 23:
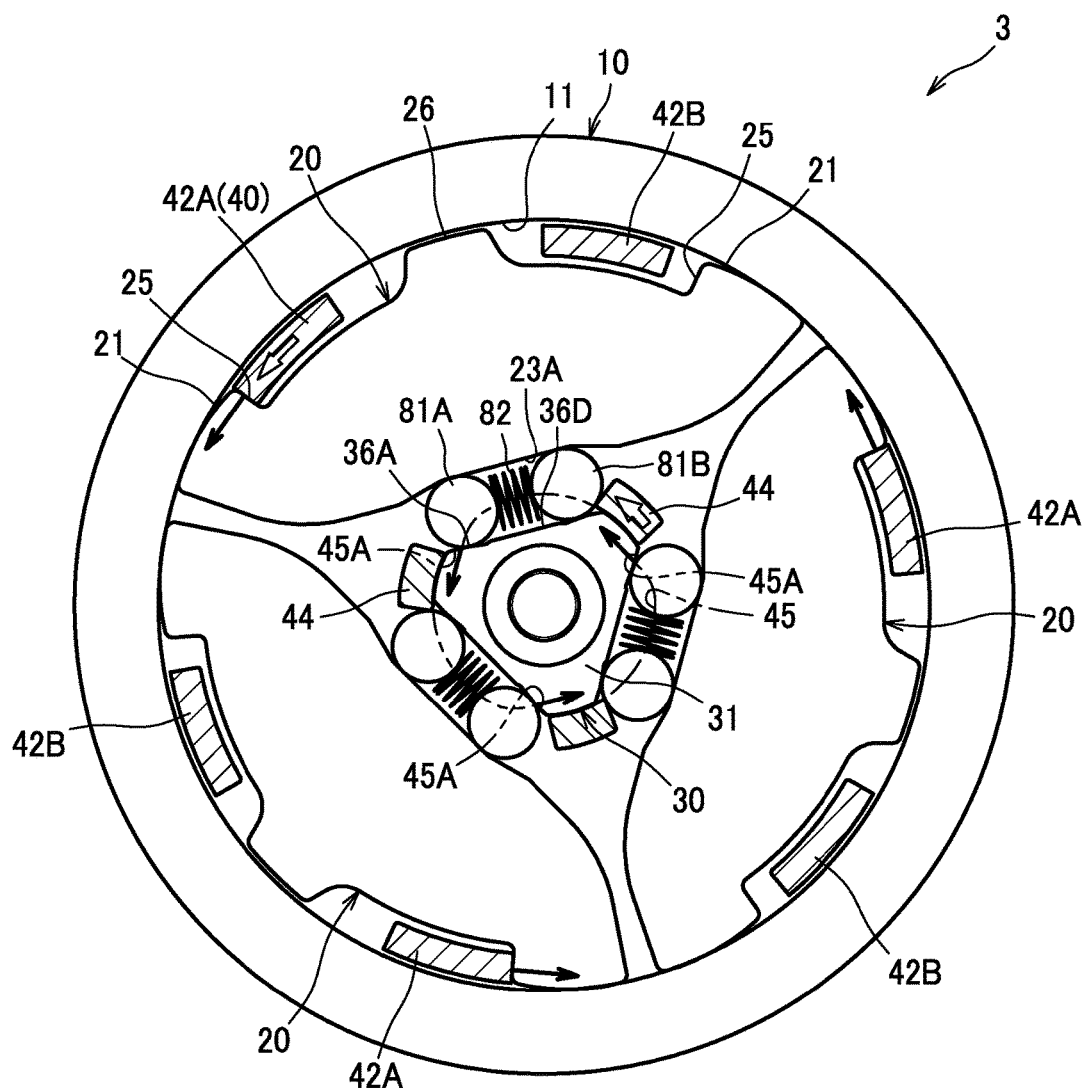
FIG. 23 is a diagram for explaining the operations of the brake device according to the second embodiment, showing a state shifted from the state shown in FIG. 22 as a result of a further counterclockwise rotary torque given to the input-side rotary member, which has caused the output-side rotary member to rotate.

When the input-side rotary member 40 is further caused to rotate counterclockwise, the output-side rotary member 30 is caused to rotate counterclockwise by virtue of the engagement of the engageable portions 45A with the action portion 31, and the brake shoes 20 are caused to rotate counterclockwise as the engageable legs 42A push the rotary force input surfaces 25, as shown in FIG. 23.

The operations starting from the state of FIG. 19 in which the brake is applied, such as performed when the lever LV is operated to lower the height of the vehicle seat S and the input-side rotary member 40 is caused to rotate clockwise, or when an excessively large clockwise rotary torque (larger than the normal use range) is inputted to the output-side rotary member 30 are similar to those performed in the first embodiment, and a duplicate description thereof will be omitted.

In a manner described above, with the brake device 3 according to the present embodiment, a rotary torque can be transmitted to the output-side rotary member 30 by virtue of the direct engagement of the engageable portions 45A with the output-side rotary member 30; thus, under the state in which a rotary torque is inputted from outside to the output-side rotary member 30, a rotary torque reverse to that rotary torque if inputted to the input-side rotary member 40 allows the input-side rotary member 40 to directly support the input torque received by the output-side rotary member 30, and to cause the output-side rotary member 30 to rotate. Therefore, an abrupt loss of the braking force as would cause the output-side rotary member 30 to rotate in an unintended direction can be prevented, and a stable operation can be achieved.

With the brake device 3, rotation of the output-side rotary member 30 can be started with a small initial load, and a feel of friction as if it scratches can be reduced.

Although some embodiments of the present invention have been described above, the present invention is not limited to the above-described embodiments, and may be implemented with modifications made thereto where appropriate.

Figure 24:
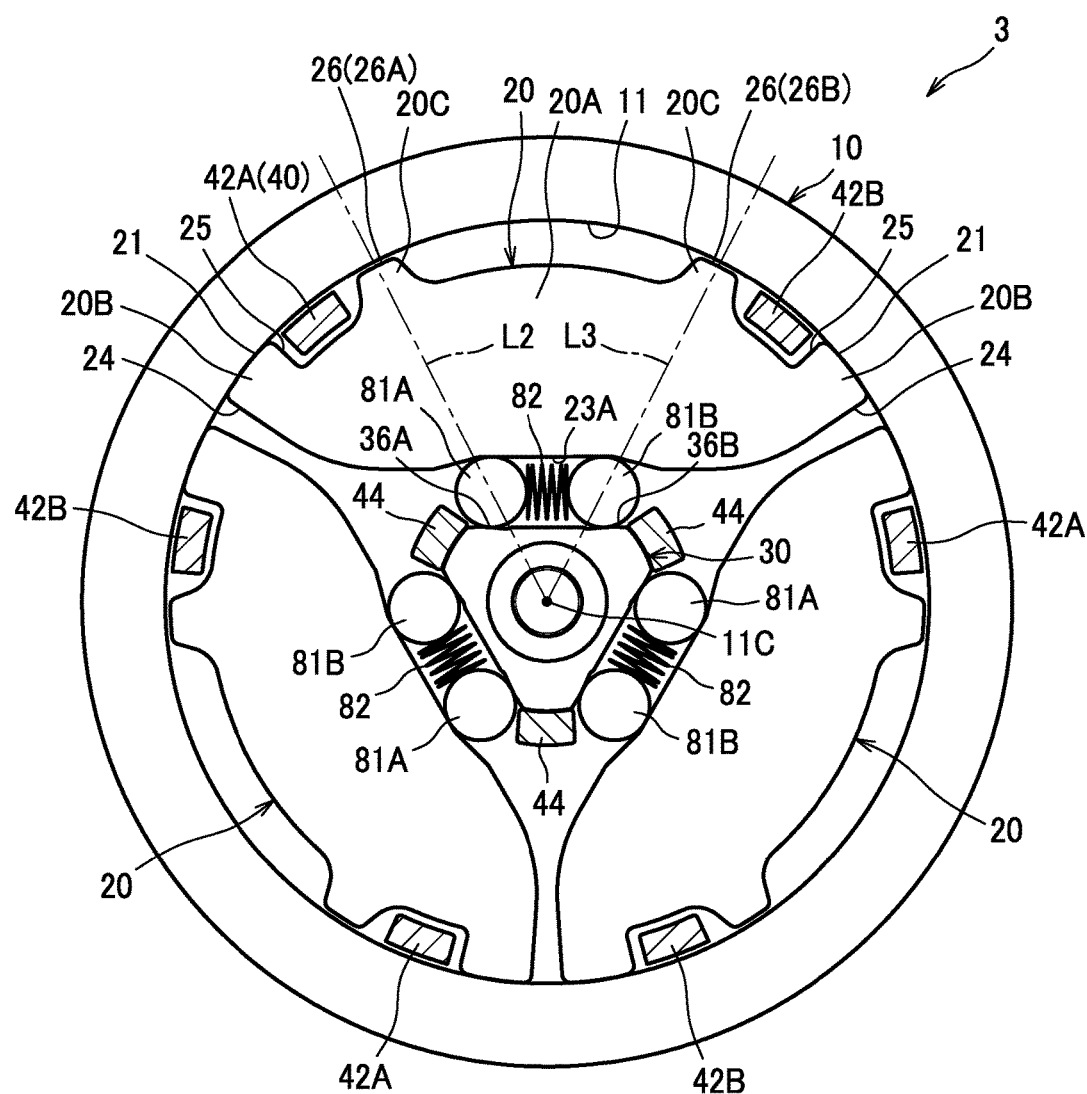
FIG. 24 is a cross section of a brake device according to a first modified example.

For example, in the above-described embodiments, only one support surface 26 is provided on each brake shoe 20, but a plurality of support surfaces may be provided on each brake shoe 20. For example, the brake device 3 shown in FIG. 24 is configured such that each brake shoe 20 includes two protrusions 20C protruding radially outward which are provided between a pair of projecting portions 20B (a pair of brake surfaces 21) on the outer periphery of the main body portion 20A, and support surfaces 26 are provided on the radially outer ends of the respective protrusions 20C. In other words, the brake device 3 shown in FIG. 24 is configured such that each brake shoe 20 has two support surfaces 26 provided thereon. In this brake device 3, each support surface 26 is located in such a position that as viewed with a line of sight aligned with an axial direction of the output-side rotary member 30, the support surface 26 intersects a straight line extending through a center 11C of curvature of the inner peripheral surface 11 and the roller 81. To be more specific, the support surface 26A located at the counterclockwise downstream side is so positioned as to intersect a straight line L2 extending through the center 11C of curvature and the center of the roller 81A, while the support surface 26B located at the clockwise downstream side is so positioned as to intersect a straight line L3 extending through the center 11C of curvature and the center of the roller 81B. With this brake device 3, when an excessively large rotary torque is imparted to the output-side rotary member 30, the support surface 26 located in a position of the periphery of the brake shoe 20 substantially opposite, with respect to the radial direction, to a region of the inside surface 23 to be pushed by the roller 81 contacts the inner peripheral surface 11; therefore, the load transmitted from the roller 81 to the brake shoe 20 can be supported efficiently by the support surface 26. Accordingly, the load stress imposed on the brake shoe 20 can be reduced more.

Figure 25:
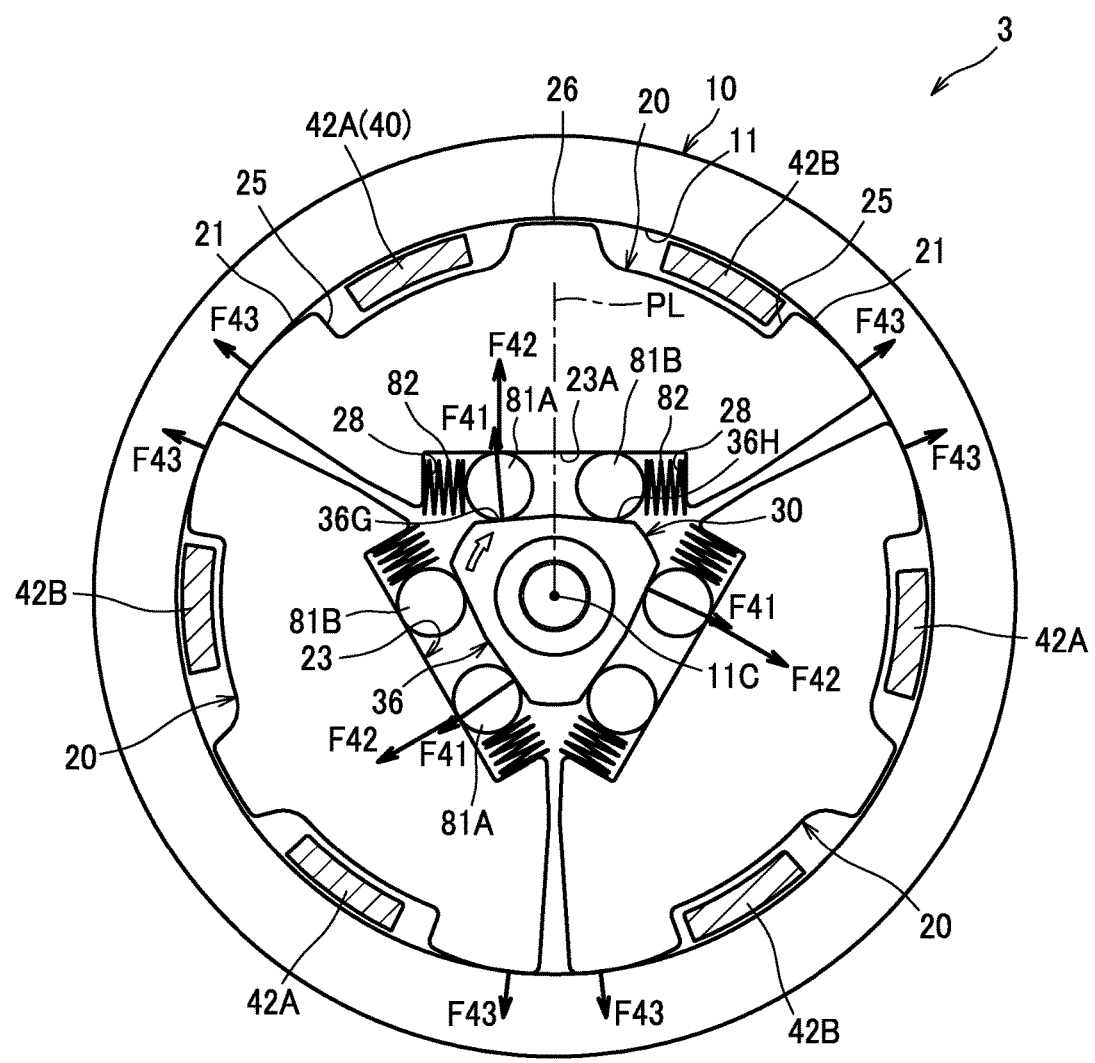
FIG. 25 is a cross section of a brake device according to a second modified example.

The above-described embodiments are configured such that the inside surface 23 includes the first contact surface 23A and the first oblique surfaces 23B, 23C, and the second contact surfaces 36A, 36B are so inclined as to get nearer to the first contact surface 23A with distance from the reference plane PL, but this configuration is not intended to be construed in a restrictive manner. For example, as shown in FIG. 25, the first oblique surfaces 23B, 23C may be omitted, and the second contact surfaces 36G, 36H may be so inclined as to go away from the first contact surface 23A with distance from the reference plane PL. To be more specific, each brake shoe 20 of the brake device 3 shown in FIG. 25 has a recess (illustrated without reference numeral) provided at a radially inner side. The recess has a bottom surface configured as an inside surface 23, and the inside surface 23 includes a first contact surface 23A contactable with the rollers 81, the first contact surface 23A being parallel to a direction of extension of a straight line connecting two ends of the pair of brake surfaces 21 in the circumferential direction. The surfaces facing in the circumferential direction inside the recess are configured as spring support surfaces 28 to support springs 82. The output-side rotary member 30 has an opposed surface 36 provided at an outer periphery thereof, which opposed surface 36 faces the inside surface 23. The opposed surface 36 includes second contact surfaces 36G, 36H so inclined as to go away from the first contact surface 23A with distance from the reference plane PL. A pair of rollers 81 is arranged between the inside surface 23 of each brake shoe 20 and the corresponding opposed surface 36. One spring 82 is provided for each roller 81, and arranged between the spring support surface 28 and the corresponding roller 81. The spring 82 is configured to bias the corresponding roller 81 into a narrower side of the space formed between the inside surface 23 and the opposed surface 36, that is, toward the center of the opposed surface 36 in the circumferential direction.

When a normal use range of the clockwise rotary torque (see the drawing) is imparted to the output-side rotary member 30, the pressure applied to the roller 81A by the second contact surface 36A and the first contact surface 23A is raised by virtue of the narrowed gap between the second contact surface 36G and the first contact surface 23A. Accordingly, the second contact surface 36G pushes the roller 81A with a force F41, and the roller 81A pushes the first contact surface 23A with a force F42, and the pair of brake surfaces 21 of each brake shoe 20 are thereby pressed against the inner peripheral surface 11 of the outer race 10 with a force F43, so that a braking force is produced. At this time, the gap between the second contact surface 36H and the first contact surface 23A is widened, but the roller 81B is biased by the spring 82 into the narrower side of the space formed between the first contact surface 23A and the second contact surface 36H, and thus is kept in contact with the first contact surface 23A and the second contact surface 36H.

Figure 26:
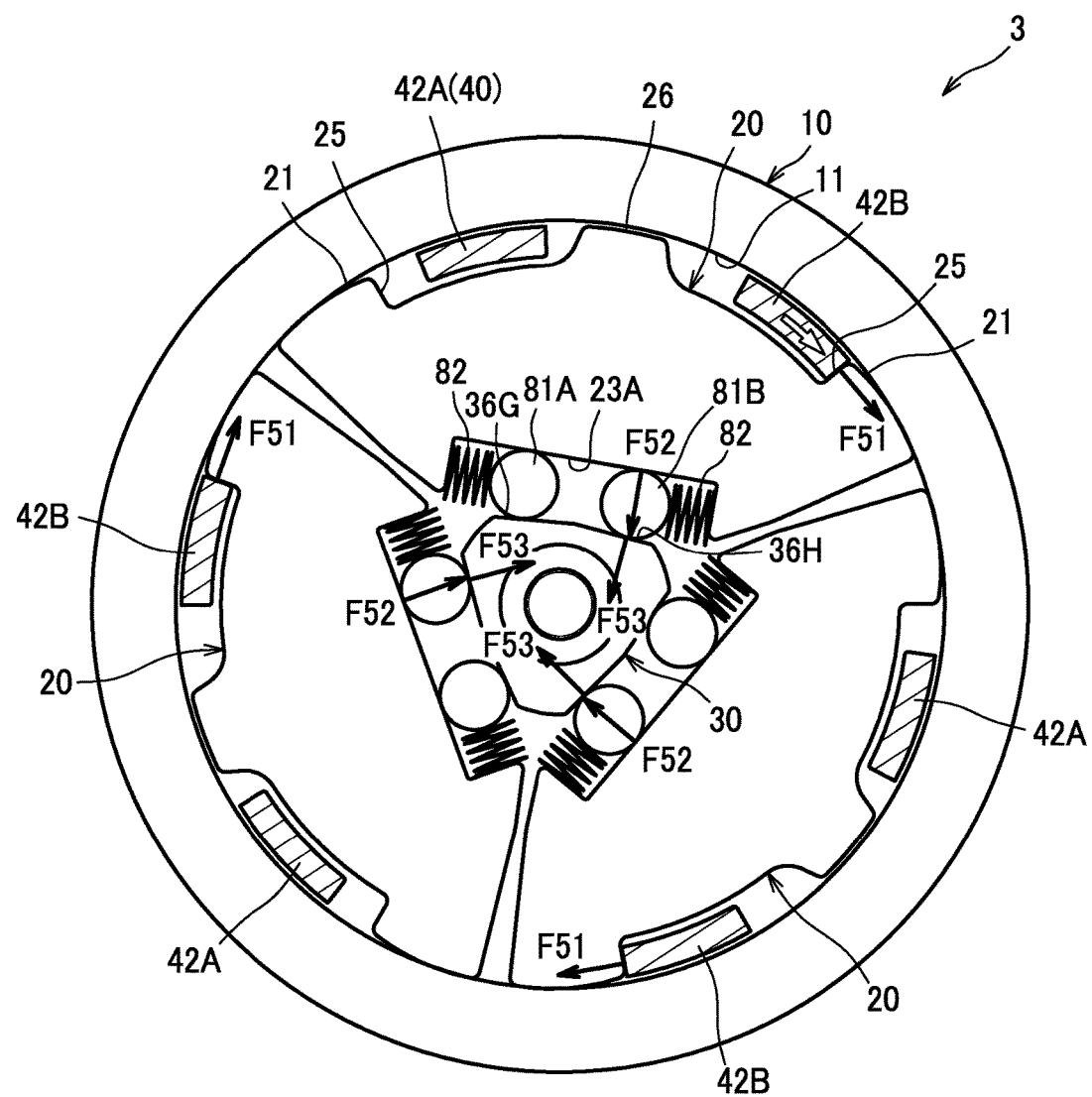
FIG. 26 is a diagram showing a state shifted from the state shown in FIG. 25 in which a clockwise rotary torque has been given to an input-side rotary member.

From the state in which the brake is applied as shown in FIG. 25, when the input-side rotary member 40 is caused to rotate counterclockwise, the engageable legs 42A come in contact with the rotary force input surfaces 25 and push the brake shoes 20 in the counterclockwise direction to thereby cause the brake shoes 20 to rotate counterclockwise. Then, the first contact surfaces 23A push the rollers 81A, and the rollers 81A push the second contact surfaces 36G, to cause the output-side rotary member 30 to rotate counterclockwise. On the other hand, from the state in which the brake is applied as shown in FIG. 25, when the input-side rotary member 40 is caused to rotate clockwise, the engageable legs 42B come in contact with the rotary force input surfaces 25 and push the brake shoes 20 with a force 51 in the clockwise direction, to cause the brake shoes 20 to rotate clockwise, as shown in FIG. 26. Then, the first contact surfaces 23A push the rollers 81B with a force F52, and the rollers 81B push the second contact surface 36H with a force F53. As described above, under the state in which the brake is applied, the rollers 81B are in contact with the first contact surfaces 23A and the second contact surfaces 36H; therefore, when the input-side rotary member 40 comes in contact with the rotary force input surfaces 25 to push the brake shoes 20, the force F53 is produced immediately, and by this force, the output-side rotary member 30 is caused to rotate clockwise. In this way, this brake device 3 can realize a stable operation by diminishing the likelihood that the rollers 81 are made unconstrained between the inside surfaces 23 and the opposed surfaces 36.

In the above-described embodiments, the inside surface 23 with which the rollers 81 are in contact is configured as a combination of flat surfaces, but may be configured as a combination of curved surfaces instead; moreover, the region in contact with the rollers 81 may be configured as one smoothly curved surface in entirety. In the above-described embodiments, the opposed surface 36 with which the rollers 81 are in contact is configured to include the second contact surface 36A that is inclined with respect to the first contact surface 23A of the inside surface 23, but the opposed surface may be a flat surface that is parallel to the first contact surface in entirety.

Figure 27:
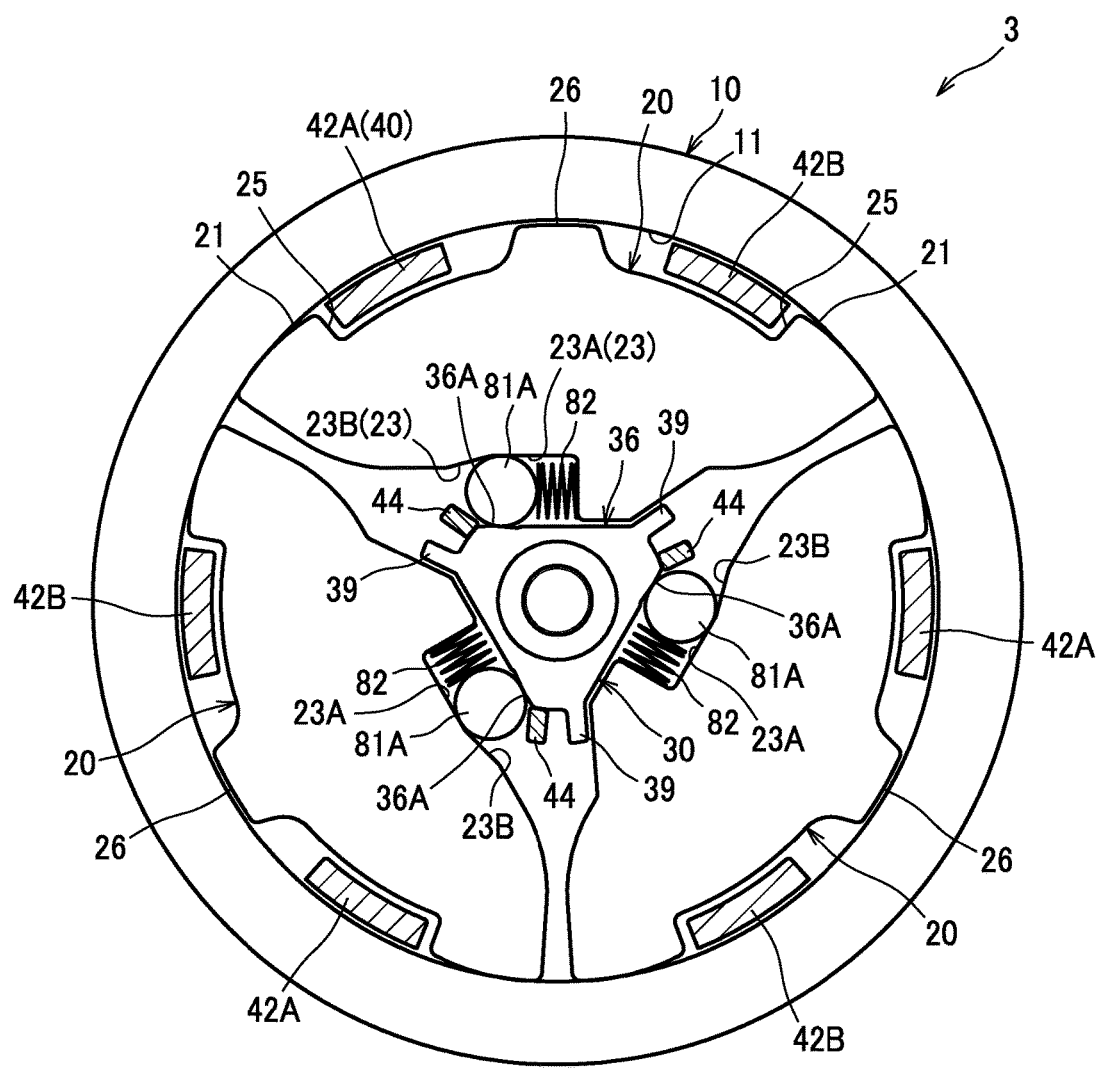
FIG. 27 is a cross section of a brake device according to a third modified example.

The above-described embodiments are configured such that when a rotary torque is given to the output-side rotary member 30, regardless of whether the direction of its rotation is the clockwise direction or the counterclockwise direction, the opposed surfaces 36 push the inside surfaces 23 through the rollers 81, the brake surfaces 21 are pressed against the inner peripheral surface 11 of the outer race 10, and the brake shoes 20 thus fail to rotate; however, the feasible configurations may not be limited thereto. For example, an alternative configuration as shown in FIG. 27 may be implemented without the rollers 81B and the second contact surfaces 36B corresponding to the rollers 81B, such that when a rotary torque is given to the output-side rotary member 30, only if the rotary torque is directed to one of the directions of rotation, specifically, the clockwise direction in the drawing, the opposed surfaces 36 (second contact surfaces 36A) push the inside surface 23 (first contact surface 23A) through the rollers 81, the brake surfaces 21 are pressed against the inner peripheral surface 11 of the outer race 10, and the brake shoes 20 thus fail to rotate. It is to be noted that the output-side rotary member 30 of the brake device 3 shown in FIG. 27 includes three engageable portions 39 protruding radially outward. With these features, when the output-side rotary member 30 is caused to rotate in the counterclockwise direction of the drawing, the engageable portions 39 push the brake shoes 20 in the counterclockwise direction, and the brake shoes 20 are caused to rotate accordingly.

In the above-described embodiments, the rollers 81B are out of contact with the retaining portions 44 under the state (see FIG. 12) in which a normal use range of rotary torque is being given to the output-side rotary member 30; however, in this state, the rollers 81B may be in contact with the retaining portions 44 to some extent. Even so, if one roller 81B is brought into contact with the inside surface 23 and the opposed surface 36 while the other roller 81A is being held between the opposed surface 36 and the inside surface 23 according as the brake shoes 20 are caused to rotate clockwise, this alternative configuration may practically present no problem.

In the above-described embodiments, the support surfaces 26 are kept apart from the inner peripheral surface 11 of the outer race 10 under the state in which no load is inputted to the output-side rotary member 30 or a normal use range of rotary torque is imparted to the output-side rotary member 30 (see FIGS. 12 to 15); however, feasible configurations may not limited thereto. For example, as long as the operation followed when the brake shoes are to be rotated is not obstructed, the support surfaces may be in contact with the inner peripheral surface to some extent under the state in which a normal use range of rotary torque is being imparted to the output-side rotary member. In addition, the support surface may not have a shape contoured to fit the inner peripheral surface of the outer race.

In the second embodiment, the input-side rotary member 40 is configured to include the engageable portions 45A that are engageable with the output-side rotary member 30 only when the input-side rotary member 45 is caused to rotate in one direction of rotation; however, the engageable portions 45A provided may be configured to be engageable with the output-side rotary member 30 when the input-side rotary member 45 is caused to rotate in either direction of rotation. Furthermore, each of the features or elements disclosed in respect to the embodiments and modifications described above may be implemented in combination.

In the above-described embodiments, the output-side rotary member 30 has portions connecting the opposed surfaces 36 which portions are configured as curved surfaces (curved regions 38), but the portions connecting the opposed surfaces may be flat.

In the above-described embodiments, the biasing member is exemplified by the compression coil spring, but a torsion spring, a leaf spring or a rubber member may be adopted, instead.

In the above-described embodiments, the movable elements are exemplified by the rollers 81, but the movable elements may be in the shape of a sphere, a polygon, a elliptic cylinder.

In the above-described embodiments, three brake shoes are provided, but the number of the brake shoes may be two, four, or more.

In the above-described embodiments, the brake device 3 is configured to include the rollers 81 as an example of movable elements, and springs 82 as biasing members, such that a load is transmitted between the inside surface 23 and the opposed surface 36 via the rollers 81, but feasible configurations may not be limited thereto. For example, an alternative configuration without movable elements and biasing members may be feasible such that the inside surface and the opposed surface are in direct contact with each other, and a load is transmitted directly therebetween.

In the above-described embodiments, each brake shoe 20 has a pair of brake surfaces 21 and a support surface 26 disposed therebetween, but the brake shoe may be provided with no support surface or with no protrusion on which such a support surface is provided.

The brake device 3, the ratchet device 2 and the clutch unit 1 are not only used in a height adjustment mechanism for a vehicle seat S, but also used, as desired, in any other apparatuses.

The invention claimed is:

1. A brake device comprising:
an outer race having a cylindrical inner peripheral surface;
a plurality of brake shoes disposed inside, with respect to a radial direction, of the outer race and arranged in a circumferential direction, each brake shoe having a pair of brake surfaces and an inside surface, each brake surface facing the inner peripheral surface, the brake surface being contactable with the inner peripheral surface, the inside surface facing inward with respect to the radial direction;
an output-side rotary member disposed inside, with respect to the radial direction, of the brake shoes, the output-side rotary member having an opposed surface provided at an outer periphery thereof, the opposed surface facing the inside surface; and
an input-side rotary member configured to contact the brake shoes or the output-side rotary member in the circumferential direction and thereby capable of imparting a rotary torque to the output-side rotary member,
wherein the inside surface and the opposed surface are configured such that a rotary torque as imparted in at least one direction of rotation to the output-side rotary member causes the opposed surface to push the inside surface and thereby causes the brake surface to be pressed against the inner peripheral surface of the outer race, thus failing to cause the brake shoe to rotate,
wherein the brake shoe has a support surface disposed between the pair of brake surfaces, the support surface being contactable with the inner peripheral surface,
wherein when a normal use range of rotary torque is imparted to the output-side rotary member, the pair of brake surfaces are pressed against the inner peripheral surface to produce a braking force, and the support surface is separate from the inner peripheral surface, and
wherein when a rotary torque larger than a normal use range is imparted to the output-side rotary member, the support surface is caused to contact the inner peripheral surface.

2. The brake device according to claim 1, wherein the support surface is kept apart from the inner peripheral surface when no load is imposed on the brake shoe.

3. The brake device according to claim 1, wherein the brake shoe includes a protrusion protrusively provided at an outer periphery thereof, and
wherein the support surface is provided on the protrusion.

4. The brake device according to claim 1, wherein the support surface is provided in a middle position between the pair of brake surfaces.

5. The brake device according to claim 1, wherein the support surface has a shape contoured to fit the inner peripheral surface.

6. A brake device comprising
an outer race having a cylindrical inner peripheral surface;
a plurality of brake shoes disposed inside, with respect to a radial direction, of the outer race and arranged in a circumferential direction, each brake shoe having a pair of brake surfaces and an inside surface, each of the brake surfaces facing the cylindrical inner peripheral surface, each of the brake surfaces being contactable with the cylindrical inner peripheral surface, the inside surface facing inward with respect to the radial direction;
an output-side rotary member disposed inside, with respect to the radial direction, of the brake shoes, the output-side rotary member having an opposed surface provided at an outer periphery thereof, the opposed surface facing the inside surface;
an input-side rotary member configured to contact the brake shoes or the output-side rotary member in the circumferential direction and thereby capable of imparting a rotary torque to the output-side rotary member; and
a movable element arranged between the inside surface and the opposed surface, and a biasing member configured to bias the movable element into a narrower side of a space formed between the inside surface and the opposed surface,
wherein the inside surface and the opposed surface are configured such that a rotary torque as imparted in at least one direction of rotation to the output-side rotary member causes the opposed surface to push the inside surface and thereby causes the brake surfaces to be pressed against the cylindrical inner peripheral surface of the outer race, thus failing to cause the brake shoe to rotate, wherein each of the brake shoes has a support surface disposed between the pair of brake surfaces, the support surface being contactable with the cylindrical inner peripheral surface, wherein the opposed surface includes a region nonparallel to the inside surface, and wherein a load is transmitted between the inside surface and the opposed surface via the movable element.

7. The brake device according to claim 6, wherein the support surface is located in such a position that as viewed with a line of sight aligned with an axial direction of the output-side rotary member, the support surface intersects a straight line extending through a center of curvature of the inner peripheral surface and the movable element.

8. The brake device according to claim 6, wherein the inside surface includes a first contact surface contactable with the movable element, the first contact surface being parallel to a direction of extension of a straight line connecting two ends of the pair of brake surfaces in the circumferential direction, and wherein the opposed surface includes a second contact surface that is contactable with the movable element when no load is imposed on the brake shoe, the second contact surface being inclined with respect to the first contact surface.

9. The brake device according to claim 8 wherein the second contact surface includes an oblique region so inclined as to get nearer to the first contact surface with distance from a reference plane intersecting a center of curvature of the inner peripheral surface and perpendicular to the first contact surface.

10. The brake device according to claim 9, wherein the second contact surface includes a first curved region bulging toward the brake shoe as viewed with a line of sight aligned with an axial direction of the output-side rotary member.

11. The brake device according to claim 10, wherein the second contact surface has radii of curvature so distributed as to decrease with distance from the reference plane.

12. The brake device according to claim 10, wherein the second contact surface is configured such that when the rotary torque is inputted to the output-side rotary member, a nip angle that a tangent plane of the second contact surface at a point of contact with the movable element forms with the first contact surface increases and subsequently decreases with increase in angle of rotation of the output-side rotary member caused by the inputted rotary torque.

13. The brake device according to claim 12, wherein the nip angle has a maximum value of 7.55 degrees or smaller.

14. The brake device according to claim 9, wherein the second contact surface is provided one in each of two outer end regions of the opposed surface in the circumferential direction.

15. The brake device according to claim 14, wherein the opposed surface includes a connecting surface region that connects the second contact surfaces provided at the two end regions.

16. The brake device according to claim 15, wherein the opposed surface has a recess at a joint between each of the second contact surfaces and the connecting surface region.

17. The brake device according to claim 15, wherein the connecting surface region includes a flat region.

18. The brake device according to claim 8, wherein the output-side rotary member has a second curved region connecting respective opposed surfaces so provided as to correspond to the respective brake shoes.

19. The brake device according to claim 8, wherein the movable element is a roller.

20. The brake device according to claim 8, wherein the input-side rotary member includes an engageable portion that is engageable with the output-side rotary member to enable transmission of a rotary torque thereto.

21. The brake device according to claim 20, wherein the engageable portion is arranged such that engagement of the engageable portion with the output-side rotary member occurs prior to engagement of the input-side rotary member with the brake shoes, when the input-side rotary member is rotated in a direction reverse to a rotary torque concurrently inputted to the output-side rotary member and borne by a braking force of the brake shoes.

* * * * *